(12) United States Patent
Ide et al.

(10) Patent No.: US 9,304,691 B2
(45) Date of Patent: Apr. 5, 2016

(54) MEMORY SYSTEM AND BANK INTERLEAVING METHOD

(71) Applicant: KABUSHIKI KAISHA TOSHIBA, Minato-ku (JP)

(72) Inventors: Takashi Ide, Kanagawa (JP); Kiyotaka Iwasaki, Kanagawa (JP); Kouji Watanabe, Kanagawa (JP); Hiroyuki Nanjou, Kanagawa (JP); Makoto Moriya, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/641,930

(22) Filed: Mar. 9, 2015

(65) Prior Publication Data

US 2015/0177993 A1 Jun. 25, 2015

Related U.S. Application Data

(63) Continuation of application No. 13/600,578, filed on Aug. 31, 2012, now Pat. No. 8,996,782.

(30) Foreign Application Priority Data

Mar. 23, 2012 (JP) .................................. 2012-068157
Mar. 23, 2012 (JP) .................................. 2012-068367

(51) Int. Cl.
*G06F 12/06* (2006.01)
*G06F 3/06* (2006.01)
(Continued)

(52) U.S. Cl.
CPC ............ *G06F 3/0611* (2013.01); *G06F 3/0659* (2013.01); *G06F 3/0688* (2013.01);
(Continued)

(58) Field of Classification Search
None
See application file for complete search history.

(56) References Cited

U.S. PATENT DOCUMENTS 5,968,168 A 10/1999 Kato
6,279,027 B1 8/2001 Kato
(Continued)

FOREIGN PATENT DOCUMENTS

JP 9-330237 12/1997
JP 2005-216345 A 8/2005
(Continued)

OTHER PUBLICATIONS

Japanese Office Action issued Dec. 11, 2015 in Japanese Patent Application No. 2012-068157 with English translation, 9 pages.

*Primary Examiner* — Duc Doan
(74) *Attorney, Agent, or Firm* — Oblon, McClelland, Maier & Neustadt, L.L.P.

(57) ABSTRACT

According to embodiments, a memory system includes a plurality of memory chips configuring banks, an instruction generator, and a memory controller. The instruction generator generates a plurality of instructions. The memory controller is configured to execute memory accesses to the banks based on the instructions. Each memory access comprises a first command sequence and a second command sequence. The first command sequence causes in-bank processing shortly subsequent to the first command. The second command sequence is executed subsequent to the in-bank processing. The memory controller executes successively a second command sequence to a first bank based on a first instruction and a first command sequence to the first bank based on a second instruction subsequent to the first instruction, and then starts a memory access to a second bank based on a third instruction while the first bank is executing the in-bank processing caused by the first command sequence.

4 Claims, 20 Drawing Sheets

(51) Int. Cl.
*G06F 13/14* (2006.01)
*G06F 13/18* (2006.01)
*G06F 12/02* (2006.01)

(52) U.S. Cl.
CPC ........... *G06F 13/14* (2013.01); *G06F 12/0246* (2013.01); *G06F 12/0607* (2013.01); *G06F 13/18* (2013.01); *G06F 2212/7208* (2013.01)

(56) References Cited

U.S. PATENT DOCUMENTS

| | | | |
|---|---|---|---|
| 7,093,059 | B2 | 8/2006 | Christenson |
| 7,337,244 | B2 | 2/2008 | Furukawa et al. |
| 8,145,858 | B2 | 3/2012 | Kinoshita |
| 8,159,889 | B2 | 4/2012 | Ryu |
| 8,917,565 | B2 | 12/2014 | Ryu |
| 2001/0011318 | A1 | 8/2001 | Dalvi et al. |
| 2005/0188147 | A1 | 8/2005 | Tanaka |
| 2006/0152981 | A1 | 7/2006 | Ryu |
| 2007/0162658 | A1 | 7/2007 | Furukawa et al. |
| 2008/0109576 | A1 | 5/2008 | Furukawa et al. |
| 2009/0265513 | A1 | 10/2009 | Ryu |
| 2009/0279365 | A1 | 11/2009 | Tanaka |
| 2010/0199025 | A1 | 8/2010 | Nanjou et al. |
| 2010/0223423 | A1 | 9/2010 | Sinclair et al. |
| 2011/0161554 | A1 | 6/2011 | Selinger et al. |
| 2012/0173806 | A1 | 7/2012 | Ryu |
| 2015/0067450 | A1 | 3/2015 | Ryu |

FOREIGN PATENT DOCUMENTS

| | | | |
|---|---|---|---|
| JP | 2006-11593 | A | 1/2006 |
| JP | 2006-195990 | A | 7/2006 |
| JP | 3999943 | B | 8/2007 |
| JP | 4536361 | B | 6/2010 |
| JP | 2010-282422 | A | 12/2010 |
| JP | 4643729 | B | 12/2010 |

FIG.21

| | COMMAND IN LOW-PRIORITY COMMAND QUEUE | SWITCH TIMING TO HIGH-PRIORITY COMMAND QUEUE | RESULT OF STOP DETERMINATION (STEP S10) ON INTERRUPTION OF HIGH-PRIORITY COMMAND QUEUE | COMMAND IN HIGH-PRIORITY COMMAND QUEUE | RESULT OF RETURN DETERMINATION (STEP S20) ON RESTART OF LOW-PRIORITY COMMAND QUEUE |
|---|---|---|---|---|---|
| C301 | Write | BEFORE NAND Busy | INTERRUPTION PROCESSING | Write | RETRY |
| C302 | | | INTERRUPTION PROCESSING | Read | RETRY |
| C303 | | | INTERRUPTION PROCESSING | Erase | RETRY |
| C304 | | DURING NAND Busy | COMPLETION PROCESSING | Write | NORMAL |
| C305 | | | COMPLETION PROCESSING | Read | NORMAL |
| C306 | | | COMPLETION PROCESSING | Erase | NORMAL |
| C307 | | AFTER NAND Busy | COMPLETION PROCESSING | Write | NORMAL |
| C308 | | | COMPLETION PROCESSING | Read | NORMAL |
| C309 | | | COMPLETION PROCESSING | Erase | NORMAL |
| C310 | Read | BEFORE NAND Busy | INTERRUPTION PROCESSING | Write | RETRY |
| C311 | | | INTERRUPTION PROCESSING | Read | RETRY |
| C312 | | | INTERRUPTION PROCESSING | Erase | RETRY |
| C313 | | DURING NAND Busy | INTERRUPTION PROCESSING | Write | RETRY |
| C314 | | | INTERRUPTION PROCESSING | Read | RETRY |
| C315 | | | INTERRUPTION PROCESSING | Erase | RETRY |
| C316 | | AFTER NAND Busy | INTERRUPTION PROCESSING | Write | RETRY |
| C317 | | | INTERRUPTION PROCESSING | Read | RETRY |
| C318 | | | INTERRUPTION PROCESSING | Erase | CONTINUATION |
| C319 | Erase | BEFORE NAND Busy | INTERRUPTION PROCESSING | Write | RETRY |
| C320 | | | INTERRUPTION PROCESSING | Read | RETRY |
| C321 | | | INTERRUPTION PROCESSING | Erase | RETRY |
| C322 | | DURING NAND Busy | INTERRUPTION PROCESSING | Write | RETRY |
| C323 | | | INTERRUPTION PROCESSING | Read | RETRY |
| C324 | | | INTERRUPTION PROCESSING | Erase | RETRY |
| C325 | | AFTER NAND Busy | INTERRUPTION PROCESSING | Write | RETRY |
| C326 | | | INTERRUPTION PROCESSING | Read | CONTINUATION |
| C327 | | | INTERRUPTION PROCESSING | Erase | RETRY |

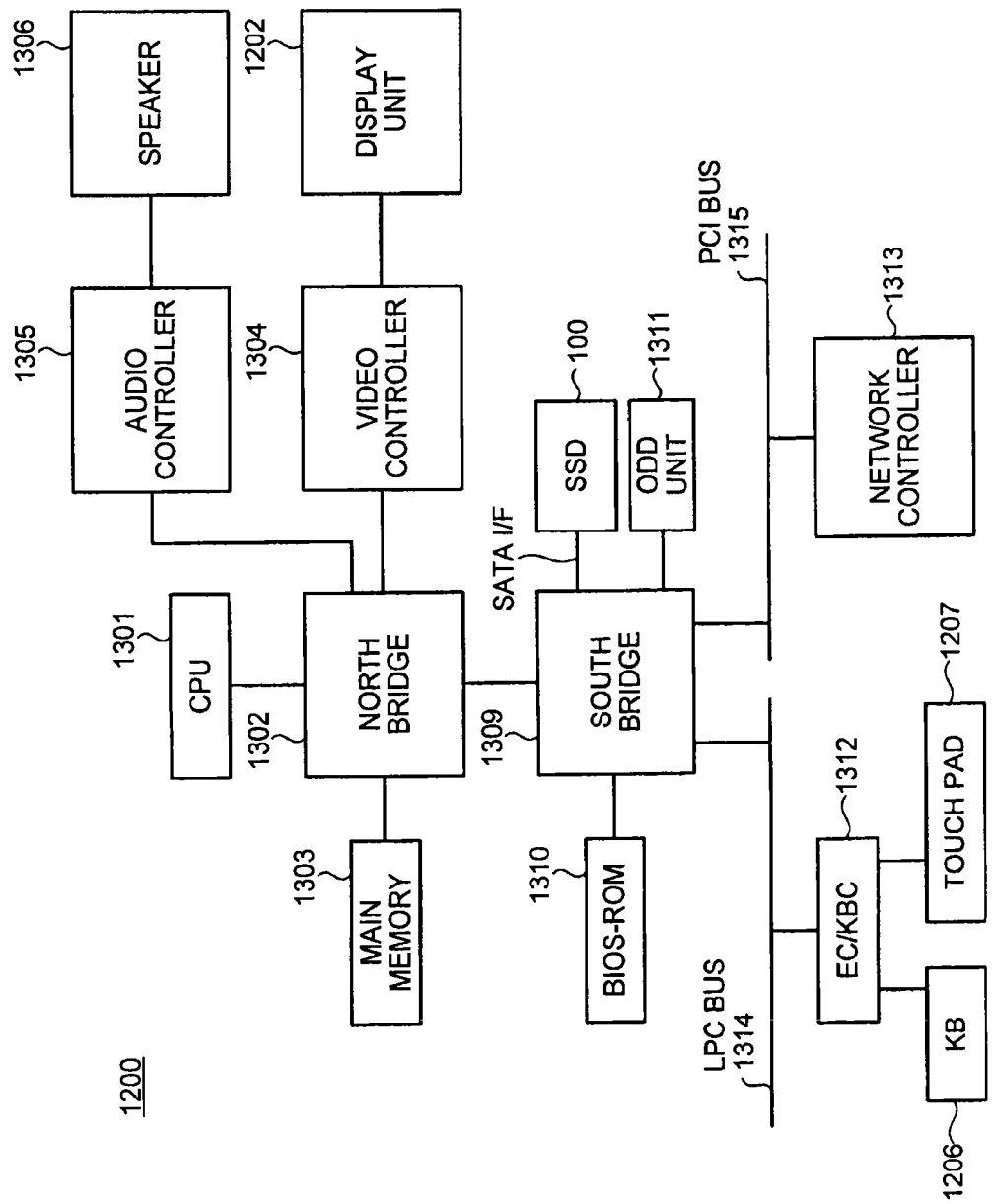

MEMORY SYSTEM AND BANK INTERLEAVING METHOD

CROSS-REFERENCE TO RELATED APPLICATIONS

This application is a continuation of and claims the benefit of priority under 35 U.S.C. §120 from U.S. Ser. No. 13/600,578, filed Aug. 31, 2012, which claims the benefit of priority from Japanese Patent Application No. 2012-068157 and Japanese Patent Application No. 2012-068367, filed on Mar. 23, 2012; the entire contents of all of which are incorporated herein by reference.

FIELD

Embodiments described herein relate generally to a memory system and a bank interleaving method.

BACKGROUND

SSD (Solid State Drive) mounting thereon a memory chip comprising NAND type storage cells is paid attention as a memory system used in a computer system. The SSD is advantageous in being faster and lighter in weight than a magnetic disk device.

In recent years, the SSD drives a plurality of memory chips in parallel thereby to enhance a transfer efficiency. One parallel operating method is a technique for interleaving a plurality of memory chips connected to the same channel in units of bank (bank interleaving). With the bank interleaving, a time to transfer data (including command, address, read data and write data) between a data transfer device and the memory chips is concealed by a time taken for the processing inside the memory chips, thereby enhancing a transfer efficiency of the memory system.

BRIEF DESCRIPTION OF THE DRAWINGS

FIG. 4 is a conceptual diagram for explaining state transits of I/O and Ry/By;

FIG. 21 is a diagram illustrating operations of the memory system according to the second embodiment;

FIG. 23 is a diagram illustrating an exemplary system structure of the personal computer mounting the SSD thereon.

DETAILED DESCRIPTION

According to embodiments, a memory system includes a plurality of memory chips comprising a non-transitory memory cell array and configuring banks, an instruction generator, and a memory controller. The instruction generator is configured to generate a plurality of instructions in response to a request from a host device. Each of the instructions instructs a memory access to the individual bank. The memory controller is configured to execute memory accesses to the banks based on the instructions. The individual memory access comprises a first command sequence and a second command sequence both exclusively executed among the banks. The first command sequence causes in-bank processing shortly subsequent to completion of the first command. The second command sequence is executed subsequent to completion of the in-bank processing. The memory controller executes successively a second command sequence to a first bank based on a first instruction and a first command sequence to the first bank based on a second instruction subsequent to the first instruction, and then starts a memory access to a second bank based on a third instruction while the first bank is executing the in-bank processing caused by the first command sequence based on the second instruction.

A memory system and a bank interleaving method according to the embodiments will be described below in detail with reference to the accompanying drawings. The present invention is not limited to the embodiments.

Figure 1:
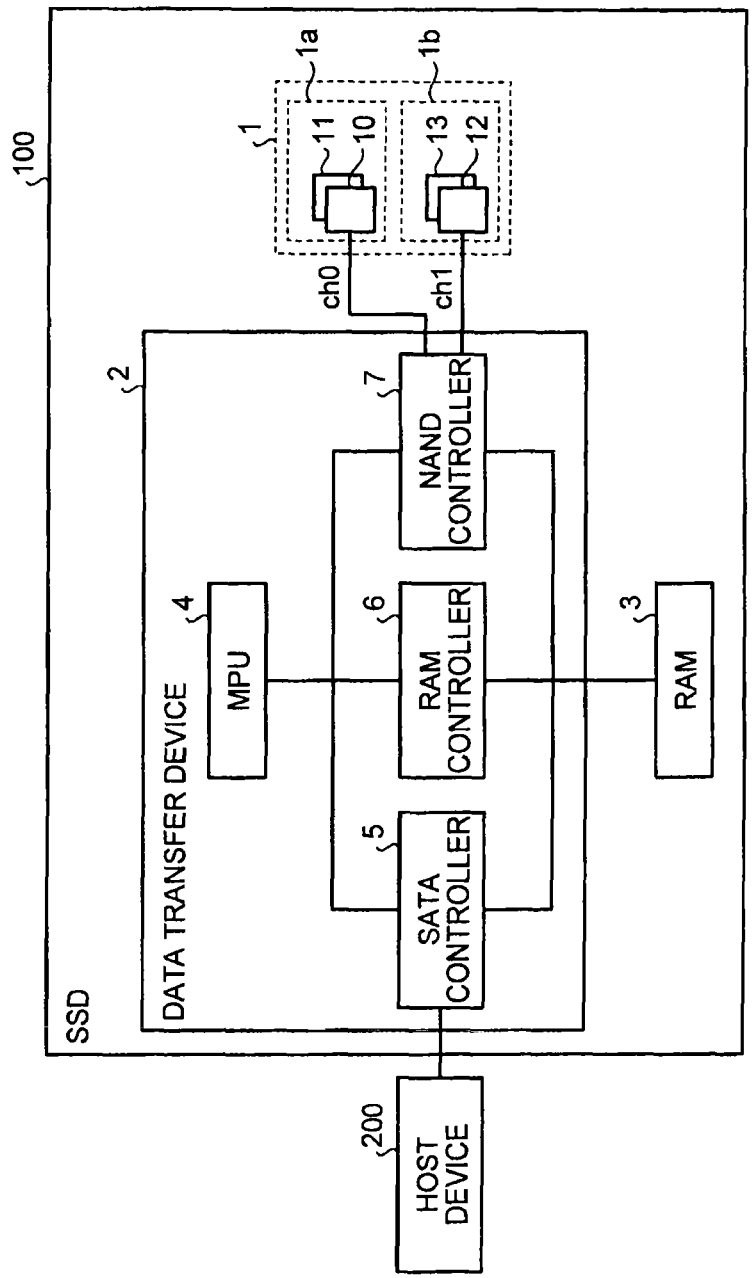
FIG. 1 is a diagram for explaining a structure of an SSD to which a memory system according to a first embodiment of the present invention is applied.

FIG. 1 is a diagram for explaining a structure of an SSD to which a memory system according to the first embodiment of the present invention is applied.

The SSD 100 is connected to a host device 200 such as a personal computer via a communication interface conforming to the SATA (Serial Advanced Technology Attachment) standard which is a serial interface, and functions as an external storage device of the host device 200. Standards other than the SATA may be employed as the communication interface standard between the SSD 100 and the host device 200. For example, the SAS (Serial Attached SCSI) standard or the PCI (Peripheral Components Interconnect) Express standard may be employed.

The SSD 100 includes a nonvolatile (non-transitory) NAND memory 1 configured to store data read and written from and into the host device 200, a data transfer device 2 configured to perform (execute) data transfer control on the SSD 100, and a RAM (Random Access Memory) 3 as memory configured to temporarily store transfer data for data transferring by the data transfer device 2. The RAM 3 functions as a data cache memory of the NAND memory 1, and may employ DRAM (Dynamic Random Access Memory), FeRAM (Ferroelectric Random Access Memory), MRAM (Magnetoresistive Random Access Memory), and the like.

The data transfer device 2 includes an MPU (instruction generation unit, instruction generator, instruction generation module) 4, a SATA controller 5, a RAM controller 6 and a NAND controller 7. The MPU 4, the SATA controller 5, the RAM controller 6, and the NAND controller 7 are connected to a bus, respectively.

The MPU 4 executes firmware thereby to entirely control the data transfer device 2. The SATA controller 5 controls data transfer between the host device 200 and the RAM 3. The RAM controller 6 controls read/write of data from/into the RAM 3. The NAND controller 7 controls read/write from/into the NAND memory 1, and controls data transfer between the NAND memory 1 and the RAM 3.

The NAND memory 1 is configured of a plurality of (two, herein) parallel operation elements 1a and 1b. The parallel operation elements 1a and 1b are individually connected to the NAND controller 7, respectively. Specifically, the parallel operation element 1a and the parallel operation element 1b are connected to the NAND interface 7 via a channel (ch) 0 wiring and via a ch1 wiring, respectively. Each parallel operation element 1a, 1b is configured of a plurality of interleavable banks (two banks including bank A and bank B, in FIG. 2). The banks in each of the channel parallel operation elements 1a and 1b are configured of one memory chip, respectively. That is, a memory chip 10 configures the bank A, and a memory chip 11 configures the bank B in operation element 1a while memory chip 12 configures another bank A and memory chip 13 configures another bank B in operation element 1b. Each bank may be configured of a plurality of memory chips.

Figure 2:
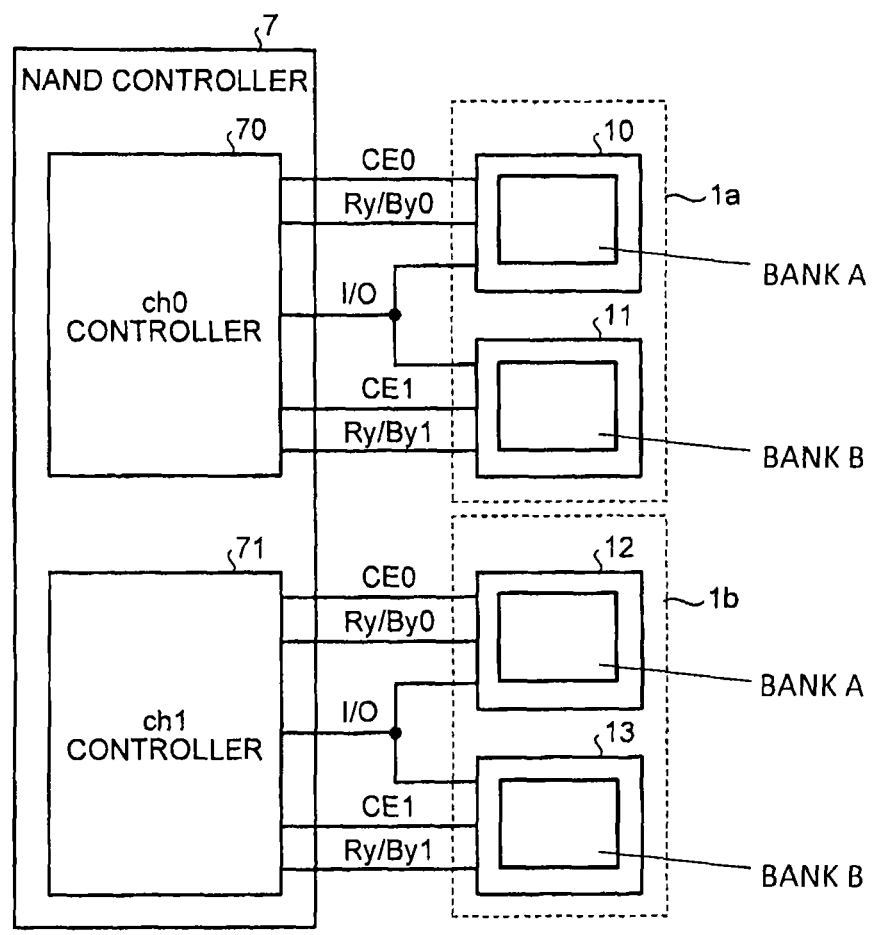
FIG. 2 is a diagram for explaining a connection relationship between a NAND controller and NAND memories in more details.

FIG. 2 is a diagram illustrating a connection relationship between the NAND controller 7 and the NAND memory 1 in more details. The NAND controller 7 includes a ch0 controller (memory controller, memory control module, memory control unit) 70 configured to control the parallel operation element 1a, and a ch1 controller (memory controller, memory control module, memory control unit) 71 configured to control the parallel operation element 1b. The ch0 controller 70 includes an I/O signal line (I/O). The memory chips 10 and 11 provided in the parallel operation element 1a are commonly connected to the I/O. The ch0 controller 70 is individually connected to the memory chips 10 and 11 via a chip enable signal (CE) and a ready busy signal (Ry/By), respectively. Thereby, the ch0 controller 70 individually operates the CEs thereby to designate a bank as an access destination. A Ry/By state is confirmed thereby to recognize operating/non-operating of the bank. The connection relationship between the ch1 controller 71 and the memory chips 10 and 11 provided in the parallel operation element 1b is the same as the connection relationship between the ch0 controller 70 and the memory chips 10 and 11 provided in the parallel operation element 1a, and thus a repeated explanation will be omitted.

Figure 3:
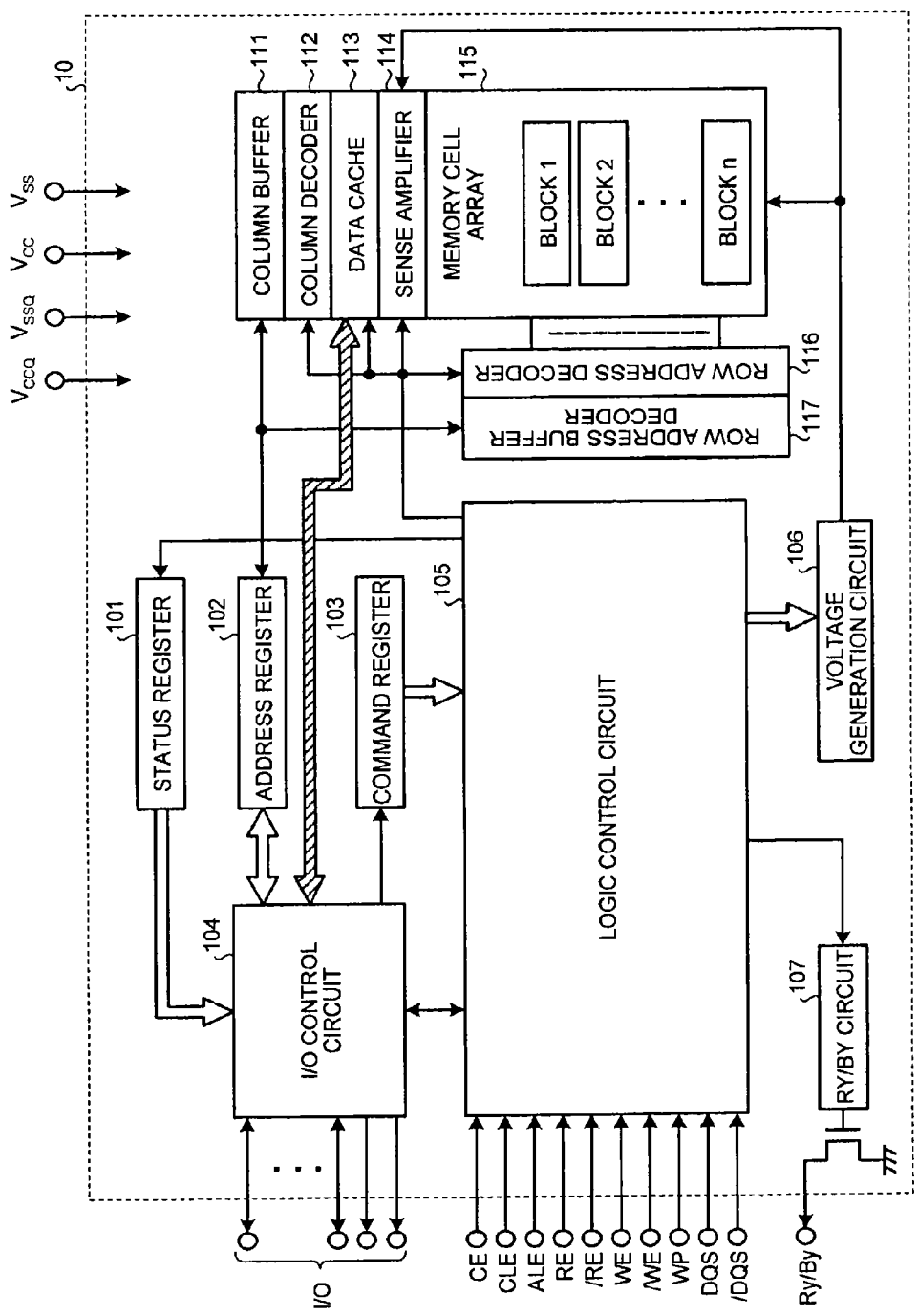
FIG. 3 is a diagram for explaining a structure of a memory chip.

FIG. 3 is a diagram for explaining a structure of the memory chips 10 and 11. The memory chip 10 and the memory chip 11 have the same structure, and thus the memory chip 10 will be described as a representative example.

The memory chip 10 includes a memory cell array 115 and its peripheral circuits (peripheral units, peripheral modules). The memory cell array 115 includes a plurality of blocks BLOCK1 to BLOCKn. Each block is configured of a plurality of memory cell transistors MC, word lines WL, bit lines BL, and the like. Data in the memory cell transistors MC in each block is collectively erased. The data cannot be erased in units of memory cell transistor or in units of page. That is, an individual block is a minimum erase unit.

The peripheral circuits include a sense amplifier 114, an input/output control circuit (input/output control unit, input/output controller, input/output control module) 104, a logic control circuit (logic control unit, logic controller, logic control module) 105, and the like.

The sense amplifier 114 reads data in the memory cells (memory cell transistors MC) in the memory cell array 115 via the bit lines BL, and detects the state of the memory cells in the memory cell array 115 via the bit lines BL.

A data cache 113 temporarily holds data read from the sense amplifier 114 or data to be supplied to the sense amplifier 114.

A column decoder 112 selects a specific bit line BL, a sense amplifier, and the like based on an address signal supplied via the I/O from the outside of the memory chip 10.

A column address buffer 111 temporarily holds an address signal, and supplies it to the column decoder 112.

A row address decoder 116 receives various voltages necessary for reading, writing or erasing data from a voltage generation circuit (voltage generation unit, voltage generator, voltage generation module) 106, and applies such voltages to specific word lines WL based on an address signal.

A row address buffer decoder 117 temporarily holds an address signal, and supplies it to the row address decoder 116.

The voltage generation circuit 106 receives reference voltages VSS, VCC, voltages VSSQ, VCCQ, and the like, and generates voltages necessary for writing, reading and erasing data based on the received voltages.

The I/O control circuit 104 receives various commands, address signals and write data for controlling the operations of the memory chip 10 via the IO terminal, and outputs read data. An address signal output from the I/O control circuit 104 is latched by an address register 102. The latched address signal is supplied to the column address buffer 111 and the row address buffer decoder 117. A command output from the I/O control circuit 104 is latched by a command register 103. A status register 101 holds values of various statuses for the I/O control circuit 104.

The memory chip 10 receives, from the outside, various control signals for controlling the I/O terminals and operations for inputting/outputting commands, addresses and data as an external interface (NAND I/F). The control signals include CE, command latch enable (CLE), address latch enable (ALE), read enable (RE and /RE), write enable (WE and /WE), write protect (WP), and clock (DQS, /DQS), for example. CLE, ALE, RE, /RE, WE, /WE, WP, DQS and /DQS are one-to-one connected to the ch0 controller 70 similar to CE and Ry/By.

The control signals are received at the corresponding terminals, and supplied to the logic control circuit 105. The logic control circuit 105 controls the I/O control circuit 104 based on the control signals, and enables or disables the signals on the terminals IO as command, address or data to reach the address register 102, the command register 103, the data cache 113 and the like via the I/O control circuit 104. The logic control circuit 105 receives the latched command from the command register 103.

Among the control signals, the WE terminal supplies data input clock, the RE terminal supplies data output clock, the DQS terminal transmits data I/O clock, the CLE terminal enables data to be input as a command, the ALE terminal enables data to be input as an address, and the CE terminal is directed for enabling all the functions for data input/output.

The Ry/By terminal indicates an internal operation state of the memory chip 10, the WP terminal transmits a write prevention signal for preventing erroneous write, and the Vcc/Vss/Vccq/Vssq terminals are directed for power supply. In the present embodiment, the /RE terminal, the /WE terminal and the /DQS terminals for transmitting complementary signals are present as the toggles used in realizing data transmission in a high-speed interface for the RE terminal, the WE terminal, and the DQS terminal, respectively.

The logic control circuit 105 is responsible for output of the ready/busy signal (Ry/By). Specifically, the logic control circuit 105 outputs a busy signal during the busy state of the memory chip 10.

A ready/busy circuit (ready/busy unit, ready/busy module) (RY/BY) 107 notifies the Ry/By signal to the outside of the memory chip 10 via a switch transistor in response to the control of the logic control circuit 105.

Figure 4:
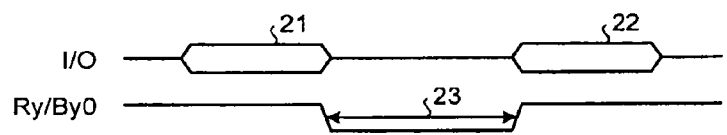

FIG. 4 is a conceptual diagram for illustrating state transitions of I/O and Ry/By0 both connecting the ch0 controller 70 and the memory chip 10 when a memory access to the memory chip 10 belonging to the parallel operation element 1a is made. The upper stage in the figure indicates the I/O state transition and the lower stage indicates the Ry/By0 state transition. It is assumed that Ry/By0 at Hi indicates the Ry state and Ry/By at Low indicates the By state. As illustrated, a memory access to the memory chip 10 is configured of a first command sequence 21 and a second command sequence 22. When the first command sequence 21 has been completely executed, the memory chip 10 performs (executes) internal processing (in-bank processing) 23 corresponding to the first command sequence 21 therein. The memory chip 10 causes Ry/By to transit to Low while executing the internal processing. Which commands the first command sequence 21 and the second command sequence 22 are configured of is previously determined per access mode (read, write, erase).

Figure 5A:
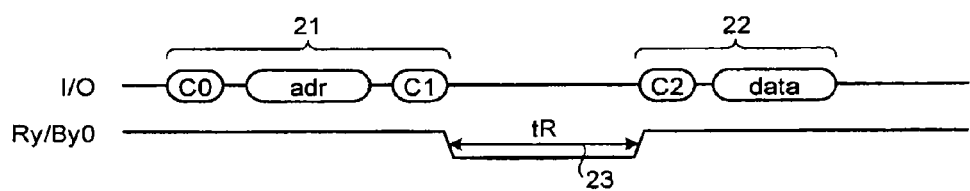
FIG. 5A is a diagram for explaining exemplary command sequences.
Figure 5B:
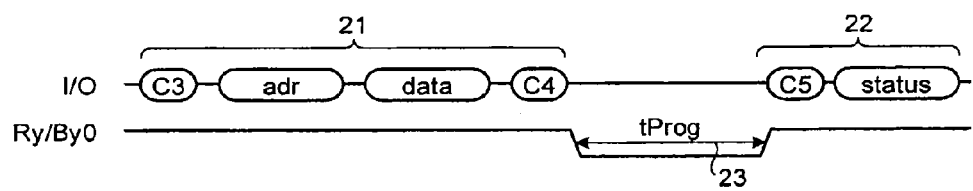
FIG. 5B is a diagram for explaining exemplary command sequences.
Figure 5C:
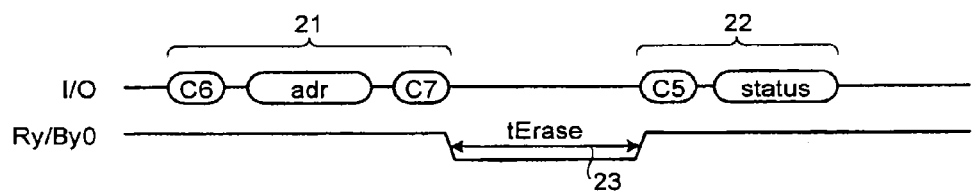
FIG. 5C is a diagram for explaining exemplary command sequences.

FIG. 5A to FIG. 5C are diagrams for explaining exemplary command sequences. FIG. 5A illustrates the command sequences for executing read. In the read mode, the ch0 controller 70 sequentially issues a read command C0 indicating that the access mode is read, a read address (adr) and a read data ready command C1 to the memory chip 10. The read command C0, the read address and the read data ready command C1 configure the first command sequence 21 for executing read. When receiving the read data ready command C1, the memory chip 10 reads read data from a position designated by the read address in the memory cell array 115, and stores the read data in the data cache 113. The internal processing by the memory chip 10 is assumed as read data ready processing. The memory chip 10 causes Ry/By0 to transit to By only during the period (tR) when the read data ready processing is being executed.

When the memory chip 10 causes Ry/By0 to transit to Ry in response to the completion of the read data ready processing, the ch0 controller 70 inputs a data transfer command C2 in the memory chip 10, and the memory chip 10 having received the data transfer command C2 segments the read data (data) on the data cache 113 per bandwidth for data transfer secured in the I/O, and sequentially transmits the segmented data to the memory chip 10. Specifically, the ch0 controller 70 toggles the RE and the memory chip 10 updates a buffer in the I/O control circuit 104 by the read data per bandwidth for data transfer in synchronization with the RE so that data transmission is realized. The ch0 controller 70 uses the DQS as a latch signal to latch the read data. The toggle processing for the data transfer command C2 and the RE configures the second command sequence 22 for executing read.

FIG. 5B illustrates the command sequences for executing write. In the write mode, the ch0 controller 70 transmits a write command C3 indicating that the access mode is write, a write address (adr), write data (data), and a program processing start command C4 to the memory chip 10. The memory chip 10 stores the transmitted write data in the data cache 113. Then, when receiving the program processing start command C4, the memory chip 10 programs the write data stored in the data cache 113 into a page designated by the write address in the memory cell array 115, and verifies the programmed read data. The internal processing by the memory chip 10 is assumed as program processing. The memory chip 10 causes Ry/By0 to transit to By only during the period (tProg) when the program processing is being executed.

When the memory chip 10 causes Ry/By0 to transit to Ry in response to the completion of the program processing, the ch0 controller 70 transmits a status read command C5 to the memory chip 10 and toggles the RE. The memory chip 10 uses the RE to store, in the buffer of the I/O control circuit 104, status information (status) indicating whether the program processing has been successfully performed. The ch0 controller 70 reads the status information stored in the buffer, and recognizes completed/non-completed of the program processing. The RE toggle processing of preparing the status read command C5 and the status information in the buffer configures the second command sequence 22 for executing write.

FIG. 5C illustrates the command sequences for executing erase. In the erase mode, the ch0 controller 70 transmits an erase command C6 indicating that the access mode is erase, an erase address (adr) and an erase processing start command C7 to the memory chip 10. The erase command C5, the erase address and the erase processing start command C7 configure the first command sequence for executing erase. When receiving the erase processing start command C7, the memory chip 10 performs (executes) erase processing of erasing a block designated by the erase address. The memory chip 10 causes Ry/By0 to transit to By only during the period (tErase) when the program processing is being executed.

When the memory chip 10 causes Ry/By0 to transit to Ry in response to the completion of the erase processing, the ch0 controller 70 transmits the status read command C5 to the memory chip 10 as in the write mode, and the memory chip 10 transmits the status information (status) to the ch0 controller 70. The RE toggle processing of preparing the status read command C5 and the status information in the buffer configures the second command sequence 22 for executing erase.

According to a technique to be compared with the embodiments of the present invention (which will be described as comparative example below), the ch0 controller 70 performs bank interleaving with a timing when the execution of the second command sequence 22 is completed as a bank switch timing. On the contrary, according to the embodiments of the present invention, the ch0 controller 70 performs (executes) the second command sequence 22 on a bank, and then successively performs (executes) the first command sequence for a next memory access on the same bank, and the timing when the first command sequence 21 is completed is assumed as a bank switch timing. For example, the internal processing 23 corresponding to the first command sequence 21 is started in the memory chip 10 after the first command sequence 21 for the memory chip 10 is completed, but the ch0 controller 70 may start executing the first command sequence 21 for the memory chip 11 while the internal processing is being executed.

Figure 6:
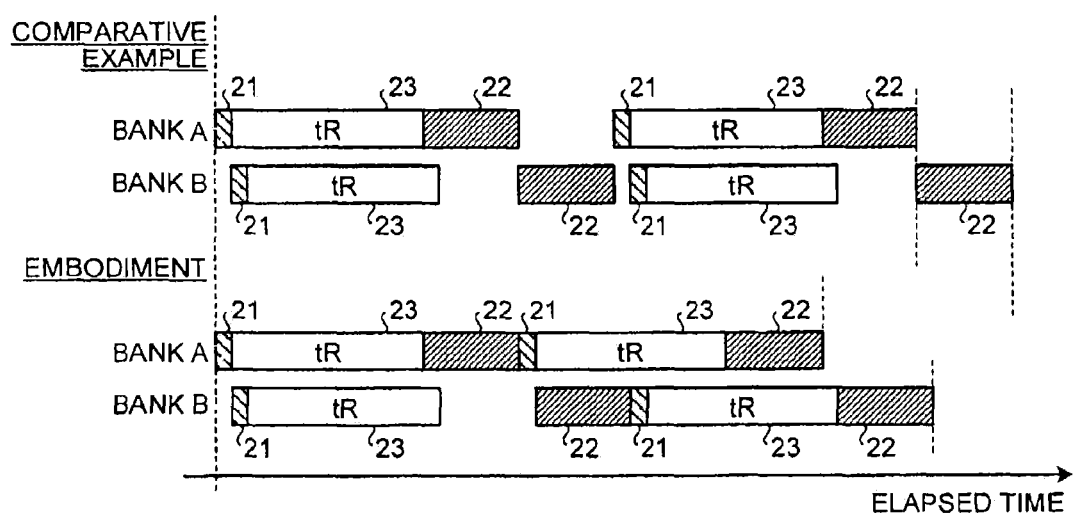
FIG. 6 is a timing chart for explaining an operation time of each bank when read is successively performed in each of the cases according to a comparative example and the first embodiment.

FIG. 6 is a timing chart for explaining an operation time of each bank when read is successively performed in each of the case where a bank interleaving method according to the comparative example is performed and the case where a bank interleaving method according to the first embodiment is performed. In the example of the figure, read is performed twice on each of the banks 0 and 1. In the read mode, the second command sequence 22 includes transfer of the read data, and thus needs a longer time than the first command sequence 21. With the bank interleaving method according to the comparative example, the execution time of the first command sequence 21 in one bank is overlapped on the execution time (tR) of the read data preparation processing in the other bank, thereby enhancing a transfer efficiency. To the contrary, with the bank interleaving method according to the first embodiment, the execution time of the second command sequence 22 in one bank may be overlapped on the execution time (tR) of the read data preparation processing in the other bank. Consequently, the execution times of the banks 0 and 1 are both further reduced than the comparative example. That is, the bank interleaving method according to the first embodiment can further enhance the transfer efficiency of both the bank 0 and the bank 1 than the comparative example.

Figure 7:
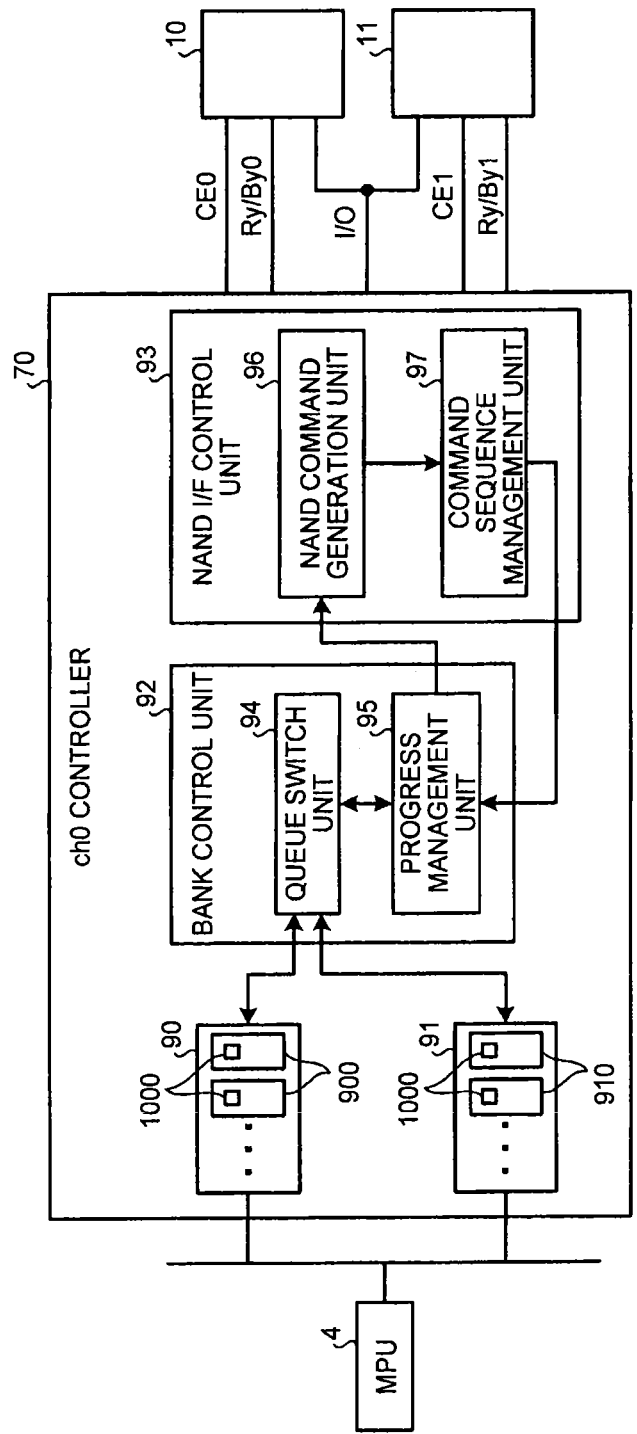
FIG. 7 is a diagram for explaining a structure of a controller per channel provided in the NAND controller.

FIG. 7 is a diagram for explaining a structure of the ch0 controller 70 and the ch1 controller 71. Since the ch0 controller 70 and the ch1 controller 71 have the same structure, only the ch0 controller 70 will be described and a repeated explanation will be omitted.

As illustrated, the ch0 controller 70 includes a queue 90 for bank A, a queue 91 for bank B, a bank control unit (bank control module, bank controller) 92, and a NAND interface (I/F) control unit (NAND I/F controller, NAND I/F control module) 93.

The queue 90 for bank A is enqueued with an instruction 900 for the bank A in the parallel operation element 1a, and the queue 91 for bank B is enqueued with an instruction 910 for the bank B in the parallel operation element 1a. The individual instructions 900 and 910 enqueued in the queues 90 and 91 each include a continuous input flag 1000 for designating whether to perform the bank interleaving according to the first embodiment, in addition to the designation of the access mode and the address of the access destination. The instructions 900 and 910 are generated by the MPU 4 in response to a request from the host device 200. The MPU classifies and inputs the generated instructions 900 and 910 into the queue 90 and the queue 91, respectively.

The bank control unit 92 includes a queue switch unit (queue switcher, queue switch module) 94 and a progress management unit (progress manager, progress management module) 95. The NAND I/F control unit 93 includes a NAND command generation unit (NAND command generator, NAND command generation module) 96 and a command sequence management unit (command sequence manager, command sequence management module) 97.

The queue switch unit 94 is configured of a demultiplexer, for example. The queue switch unit 94 switches the queue as the connection destination of the progress management unit 95 between the queue 90 for bank A and the queue 91 for bank B on the basis of a select signal from the progress management unit 95.

The progress management unit 95 reads the instructions 900 and 910 stored in the queues 90 and 91, erases the same, and confirms a presence of the instructions. When changing the queue as the access destination, the progress management unit 95 switches a select signal to be supplied to the queue switch unit 94. The progress management unit 95 generates a first identifier indicating the first command sequence 21 and a second identifier indicating the second command sequence 22 based on the instructions 900 and 910 read from the queues 90 and 91, and sequentially inputs the generated first identifier and second identifier into the NAND command generation unit 96. The progress management unit 95 adjusts an input timing per command sequence on the basis of an Ry/By signal per bank, a command sequence completion signal from the command sequence management unit 97, a determination as to whether the instructions 900 and 910 are stored in the queues 90 and 91, the continuous input flag 1000 of instructions 900 and 910 subsequent to the instructions 900 and 910 being executed.

When being input with an identifier from the progress management unit 95, the NAND command generation unit 96 generates a command sequence corresponding to the input identifier, and inputs the generated command sequence into the command sequence management unit 97.

The command sequence management unit 97 transmits the input command sequence to the memory chips 10 and 11. When the command sequence involves reception of the read data, the reception of the read data is also executed. When completing the input command sequence, the command sequence management unit 97 inputs a command sequence completion signal into the progress management unit 95.

Figure 8:
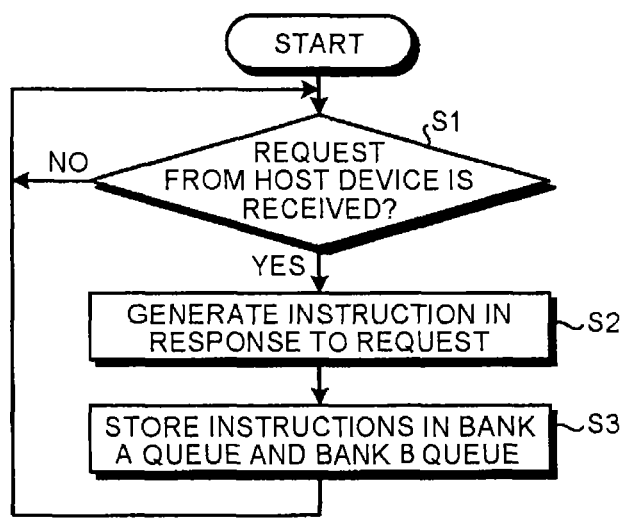
FIG. 8 is a flowchart for explaining operations of an MPU.

FIG. 8 is a flowchart for explaining the operations of the MPU 4. The MPU 4 determines whether the SATA controller 5 has received a request (read request, write request, erase request) from the host device 200 (step S1). When the SATA controller 5 has not received a request (step S1, No), the MPU 4 performs the processing in step S1 again. When the SATA controller 5 has received a request (step S1, Yes), the MPU 4 generates an instruction according to the request received by the SATA controller 5 (step S2), and classifies and stores the generated instruction into the queue 90 for bank A or the queue 91 for bank B (step S3). Then, the MPU 4 performs the processing in step S1 again.

Figure 9:
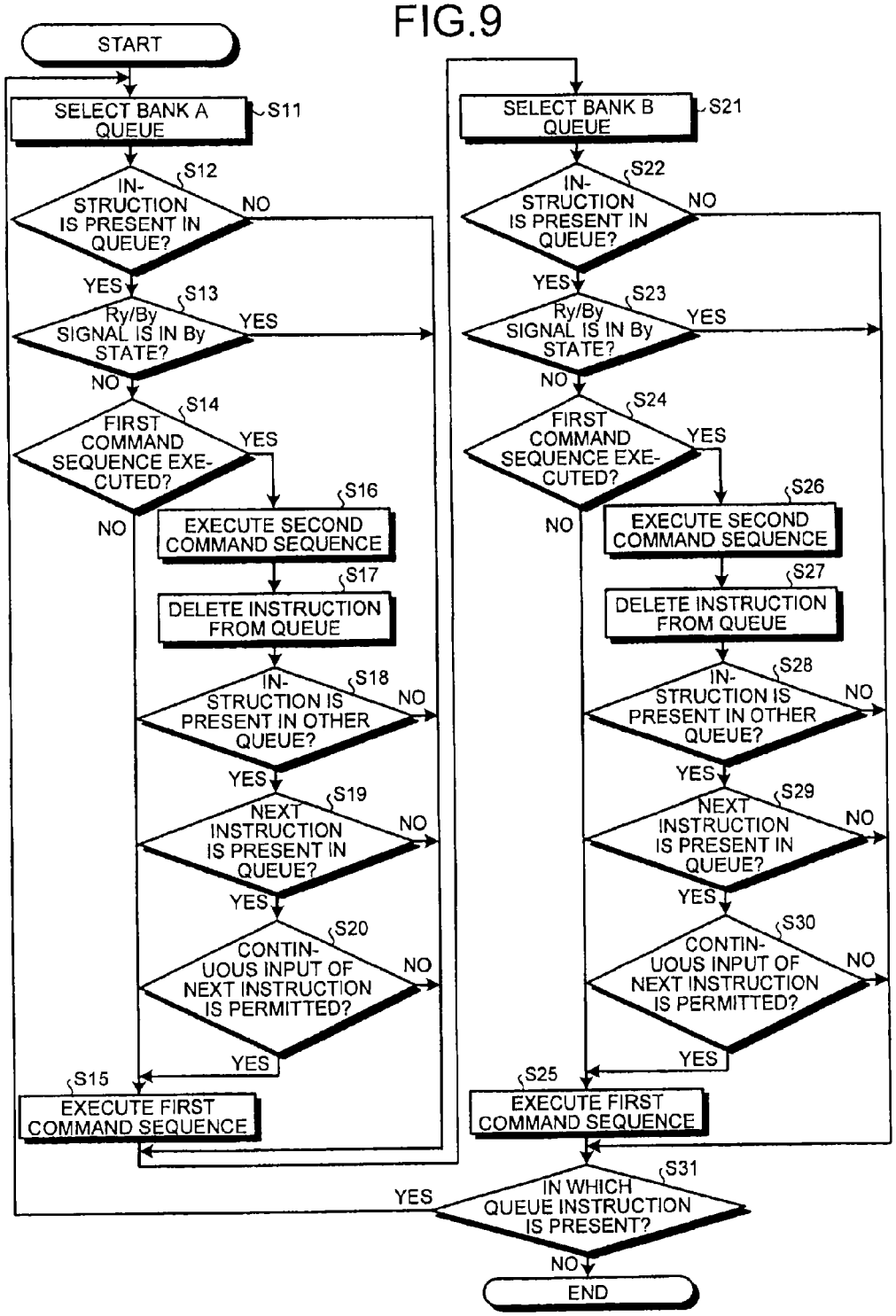
FIG. 9 is a flowchart for explaining operations of the controller per channel provided in the NAND controller.

FIG. 9 is a flowchart for explaining the operations of the controllers 70 and 71 per channel provided in the NAND controller 7. Since the ch0 controller 70 and the ch1 controller 71 have the same structure, only the ch0 controller 70 will be described herein, and a repeated explanation will be omitted.

At first, the progress management unit 95 operates a select signal to be input into the queue switch unit 94 to select the queue 90 for bank A (step S11). Then, the progress management unit 95 determines whether an instruction 900 is present in the queue 90 for bank A (step S12). When an instruction 900 is present in the queue 90 for bank A (step S12, Yes) and when the instruction 900 has not been read, the progress management unit 95 reads the instruction 900 to generate the first identifier and the second identifier corresponding to the instruction 900.

Subsequently, the progress management unit 95 determines whether Ry/By0 indicates By (step S13). When Ry/By0 indicates Ry not By (step S13, No), the progress management unit 95 determines whether the memory chip 10 has executed the first command sequence 21 (step S14). When the memory chip 10 has not executed the first command sequence 21 (step S14, No), the progress management unit 95 causes the memory chip 10 to execute the first command sequence 21 (step S15). Specifically, the progress management unit 95 inputs the generated first identifier into the NAND command generation unit 96, and the NAND command generation unit 96 generates the first command sequence 21 based on the input first identifier. The command sequence management unit 97 executes the first command sequence 21 generated by the NAND command generation unit 96 for the memory chip 10, and on the completion of the first command sequence 21, transmits a sequence execution completion signal to the progress management unit 95. The progress management unit 95 determines whether it has received the sequence execution completion signal after the transmission of the first identifier, thereby determining whether the first command sequence 21 has been executed.

When the memory chip 10 has executed the first command sequence 21 (step S14, Yes), the progress management unit 95 causes the memory chip 10 to execute the second command sequence 22 (step S16). Specifically, the progress management unit 95 inputs the generated second identifier into the NAND command generation unit 96, and the NAND command generation unit 96 generates the second command sequence 22 based on the input second identifier. The command sequence management unit 97 executes the second command sequence 22 generated by the NAND command generation unit 96 for the memory chip 10, and on the completion of the second command sequence 22, transmits a sequence execution completion signal to the progress management unit 95. The progress management unit 95 determines whether it has received the sequence execution completion signal after the transmission of the second identifier, thereby determining whether the second command sequence 22 has been executed.

After the completion of the second command sequence 22, the progress management unit 95 deletes the instruction 900 which has been executed by the processing in step S16 from the queue 90 for bank A (step S17), and determines whether an instruction 910 is present in the other queue (the queue 91 for bank B) (step S18). When executing step S18, the progress management unit 95 causes the queue switch unit 94 to temporarily switch the queue. When an instruction 910 is present in the bank 91 for bank B (step S18, Yes), the progress management unit 95 determines whether a next instruction 900 is present in the queue 90 for bank A (step S19).

When a next instruction 900 is present in the queue 90 for bank A (step S19, Yes), the progress management unit 95 determines whether the next instruction 900 is permitted to continuously input (step S20). The progress management unit 95 confirms the continuous input flag 1000 associated with the next instruction 900, thereby determining whether the instruction 900 is permitted to continuously input.

When the next instruction 900 is permitted to continuously input (step S20, Yes), the progress management unit 95 reads the next instruction 900, and generates the first identifier and the second identifier corresponding to the instruction 900. Then, with the processing in step S15, the progress management unit 95 causes the memory chip 10 to execute the first command sequence 21 corresponding to the next instruction 900.

When Ry/By0 indicates By (step S13, Yes), when an instruction 900 is not present in the queue 90 for bank A (step S12, No), when an instruction 910 is not present in the queue 91 for bank B (step S18, No), when an instruction 900 is not present in the queue 90 for bank A (step S19, No), when the next instruction 900 is not permitted to continuously input (step S20, No), or after the processing in step S15 is completed, the progress management unit 95 switches the select signal supplied to the bank switch unit 94, and selects the queue 91 for bank B (step S21).

After the processing in step S21, the progress management unit 95 determines whether an instruction 910 is present in the queue 91 for bank B (step S22). When an instruction 910 is present in the queue 91 for bank B (step S22, Yes) and when the instruction 910 has not been read, the progress management unit 95 reads the instruction 910 and generates the first identifier and the second identifier corresponding to the instruction 910.

Subsequently, the progress management unit 95 determines whether Ry/By1 indicates By (step S23). When Ry/By1 indicates Ry not By (step S23, No), the progress management unit 95 determines whether the memory chip 11 has executed the first command sequence 21 (step S24). When the memory chip 10 has not executed the first command sequence 21 (step S24, No), the progress management unit 95 causes the memory chip 1 to execute the first command sequence 21 (step S25). Specifically, the progress management unit 95 inputs the generated first identifier into the NAND command generation unit 96, and the NAND command generation unit 96 generates the first command sequence 21 based on the input first identifier. The command sequence management unit 97 executes the first command sequence 21 generated by the NAND command generation unit 96 on the memory chip 11, and on the completion of the first command sequence 21, transmits a sequence execution completion signal to the progress management unit 95. The progress management unit 95 determines whether it has received the sequence execution completion signal after the transmission of the first identifier, thereby determining whether the first command sequence 21 has been executed.

When the memory chip 11 has executed the first command sequence 21 (step S24, Yes), the progress management unit 95 causes the memory chip 11 to execute the second command sequence 22 (step S26). Specifically, the progress management unit 95 inputs the generated second identifier into the NAND command generation unit 96, and the NAND command generation unit 96 generates the second command sequence 22 based on the input second identifier. The command sequence management unit 97 executes the second command sequence 21 generated by the NAND command generation unit 96 on the memory chip 11, and on the completion of the second command sequence 21, transmits a sequence execution completion signal to the progress management unit 95. The progress management unit 95 determines whether it has received the sequence execution completion signal after the transmission of the second identifier, thereby determining whether the first command sequence 21 has been executed.

The progress management unit 95 deletes the instruction 910 executed in the processing in step S26 from the queue 91 for bank B after the completion of the second command sequence 22 (step S27), and determines whether an instruction 900 is present in the other queue or the queue 90 for bank A (step S28). On the execution of step S28, the progress management unit 95 causes the queue switch unit 94 to temporarily switch the queue. When an instruction 900 is present in the queue 90 for bank A (step S28, Yes), the progress management unit 95 determines whether a next instruction 910 is present in the queue 91 for bank B (step S29).

When a next instruction 910 is present in the queue 91 for bank B (step S29, Yes), the progress management unit 95 determines whether the next instruction 910 is permitted to continuously input (step S30). The progress management unit 95 confirms the continuous input flag 1000 associated with the next instruction 900, thereby determining whether the instruction 900 is permitted to continuously input.

When the next instruction 910 is permitted to continuously input (step S30, Yes), the progress management unit 95 reads the next instruction 910, and generates the first identifier and the second identifier corresponding to the instruction 910. With the processing in step S25, the progress management unit 95 causes the memory chip 11 to execute the first command sequence 21 corresponding to the next instruction 910.

When Ry/By0 indicates By (step S23, Yes), when an instruction 910 is not present in the queue 91 for bank B (step S22, No), when an instruction 900 is not present in the queue 90 for bank A (step S28, No), when an instruction 910 is not present in the queue 91 for bank B (step S29, No), when the next instruction 910 is not permitted to continuously input (step S30, No), or after the processing in step S25 is completed, the progress management unit 95 determines whether an instruction 900, 910 is present in either of the queues 90 and 91 (step S31). When an instruction 900, 910 is present in either of the queues 90 and 91 (step S31, Yes), the processing in step S11 is performed, and when an instruction 900, 910 is present in neither of the queues 90 and 91 (step S31, No), the NAND controller 7 ends its operation.

In this way, the ch0 controller 70 starts making a memory access to the bank B (the memory chip 11) after successively executing the second command sequence 22 for the i-th instruction 900 and the first command sequence 21 for the i+1-th instruction 900 on the bank A (the memory chip 10) and while the memory chip 10 is executing the internal processing 23.

Figure 10:
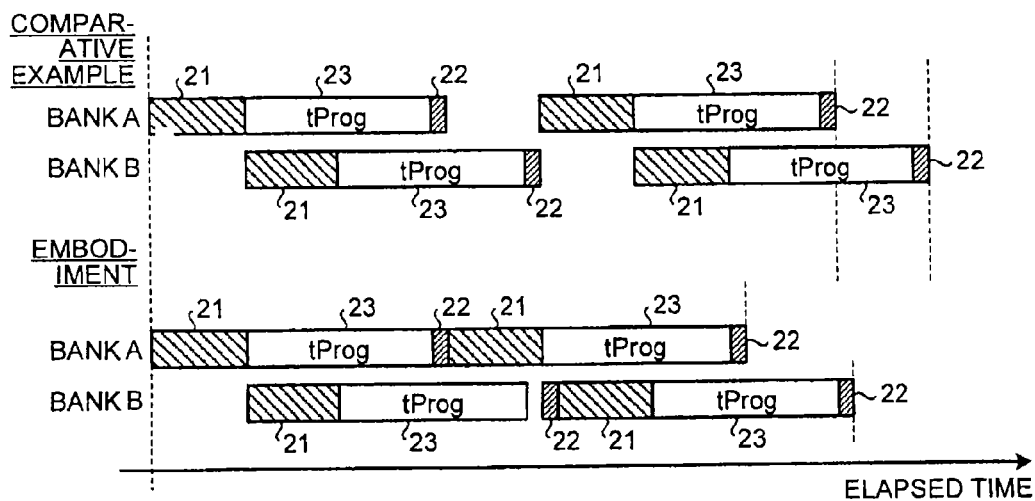
FIG. 10 is a timing chart for explaining an operation time of each bank when write is successively performed in each of the cases according to the comparative example and the first embodiment.

FIG. 10 is a timing chart for explaining an operation time of each bank when write is successively performed in each of the case where the bank interleaving method according to the comparative example is performed and the case where the bank interleaving method according to the first embodiment is performed. In the write mode, the first command sequence 21 includes transfer of the write data, and thus needs a longer time than the second command sequence 22. The bank interleaving method according to the first embodiment can more efficiently conceal the execution time of the first command sequence 21 taking a longer execution time in the command sequence than the comparative example, thereby enhancing a transfer efficiency of both the bank A and the bank B also in the write more.

Figure 11:
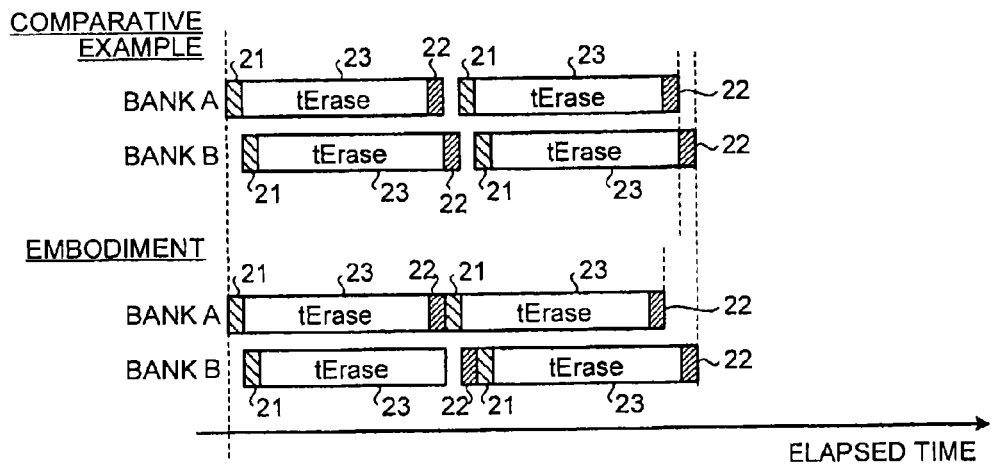
FIG. 11 is a timing chart for explaining an operation time of each bank when erase is successively performed in each of the cases according to the comparative example and the first embodiment.

FIG. 11 is a timing chart for explaining an operation time of each bank when erase is successively performed in each of the case where the bank interleaving method according to the comparative example is performed and the case where the bank interleaving method according to the first embodiment is performed. In the erase mode, both the first command sequence 21 and the second command sequence 22 need a comparable execution time. In this case, as illustrated, a transfer efficiency of the bank A can be enhanced according to the first embodiment.

Figure 12A:
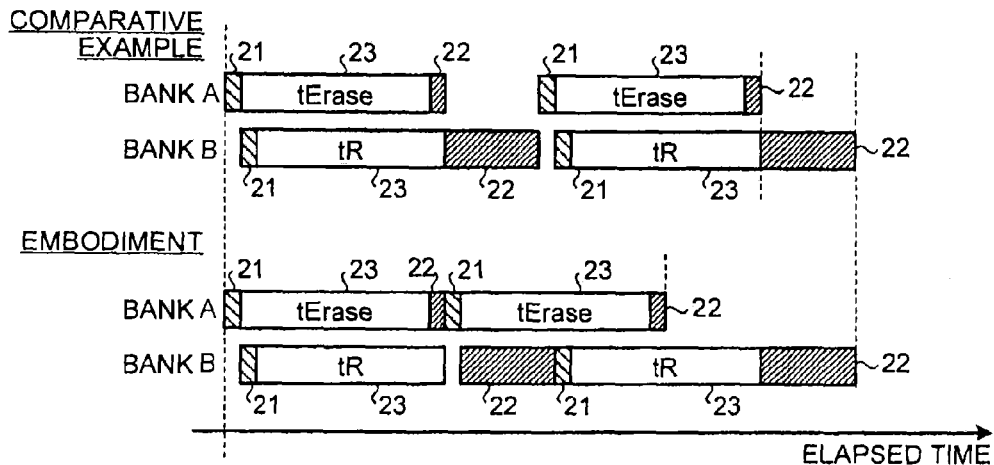
FIG. 12A is a timing chart for explaining an operation time of each bank when an access mode for memory access per bank is randomly configured in each of the cases according to the comparative example and the first embodiment.
Figure 12B:
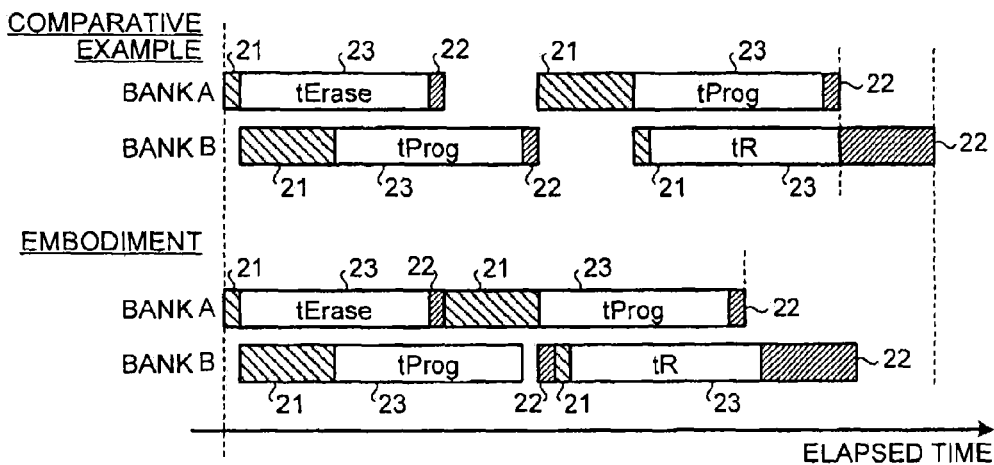
FIG. 12B is a timing chart for explaining an operation time of each bank when the access mode for memory access per bank is randomly configured in each of the cases according to the comparative example and the first embodiment.
Figure 12C:
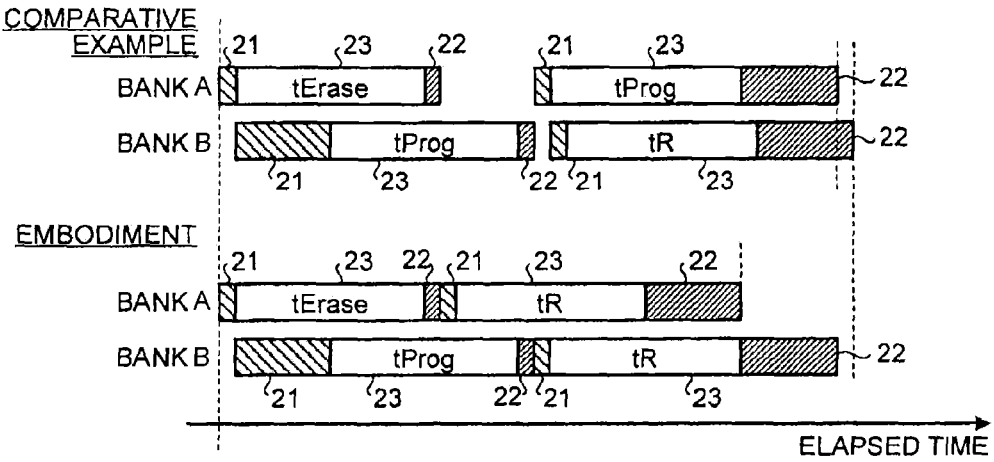
FIG. 12C is a timing chart for explaining an operation time of each bank when the access mode for memory access per bank is randomly configured in each of the cases according to the comparative example and the first embodiment.

FIGS. 12A to 12C are timing charts for explaining an operation of each bank when the access mode for memory access per bank is randomly configured in each of the case where the bank interleaving method according to the comparative example is performed and the case where the bank interleaving method according to the first embodiment is performed.

FIG. 12A illustrates a case in which an erase access is made to the bank A twice and a read access is made to the bank B twice. As in the example of the figure, when the first memory access to the bank 0 ends earlier than the timing when the internal processing of the first memory access to the bank B ends, the execution time of the first command sequence 21 for the second memory access to the bank A cannot be concealed. Thus, a transfer efficiency of the bank A can be further enhanced with the first embodiment than with the comparative example.

FIG. 12B illustrates a case in which an erase access and a write access are made to the bank A and a read access is made to the bank B twice. As in the example of the figure, when the timing when the internal processing of the first memory access to the bank B ends is later than the timing when the first memory access to the bank A ends and is earlier than the timing when the first command sequence 21 for the second memory access to the bank A ends, part of the execution time of the first command sequence 21 for the second memory access to the bank A can be concealed. Thus, a transfer efficiency of both the bank A and the bank B can be further enhanced with the first embodiment than with the comparative example.

FIG. 12C illustrates a case in which an erase access and a read access are made to the bank A and a write access and a read access are made to the bank B. As in the example of the figure, when the timing when the internal processing of the first memory access to the bank B ends is later than the timing when the first command sequence 21 for the second memory access to the bank A ends, the execution time of the first command sequence 21 for the second memory access to the bank A can be completely concealed. Thus, a transfer efficiency of both the bank A and the bank B can be further enhanced with the first embodiment than with the comparative example.

How the MPU 4 sets the continuous input flag 1000 per instruction has not been particularly described in the above explanation, but the MPU 4 can arbitrarily set the continuous input flag 1000. For example, the MPU 4 can set a value at which the continuous input flag 1000 of an instruction per read access is permitted to continuously input when a read access is continuously made as in the example of FIG. 6. Further, as illustrated in FIG. 12B and FIG. 12C, when the timing when the internal processing of the first memory access to the bank 1 ends is later than the timing when the first memory access to the bank A ends, a transfer efficiency of both the bank A and the bank B can be enhanced. When a transfer efficiency of the bank A and the bank B can be enhanced, or when the timing when the internal processing of the first memory access to the bank B ends is later than the timing when the first memory access to the bank A ends, the MPU 4 can set a value for permitting continuous input in the continuous input flag 1000 of the instruction for the second memory access to the bank A.

There has been described above that the parallel operation elements 1a and 1b each include two banks 0 and 1, but the parallel operation elements 1a and 1b may each include three or more banks. In this case, the channel controllers 70 and 71 provided in the NAND controller 7 can serially execute the processings in step S1 to step S20 per bank.

In this way, according to the first embodiment of the present invention, after the second command sequence 22 for the i-the instruction 900 and the first command sequence 21 for the i+1-th instruction 900 are successively executed for the bank A (the memory chip 10) and while the memory chip 10 is executing the internal processing 23, the ch0 controller 70 starts making a memory access to the bank B (the memory chip 11), thereby enhancing a transfer efficiency of the SSD 100.

The ch0 controller 70 determines whether to successively execute the first command sequence 21 for the i+1-th instruction 900 immediately after (shortly subsequent to) the second command sequence 22 for the i-th instruction 900 on the basis of the continuous input flag 1000 associated with the i+1-th instruction 900, thereby switching the control of successively executing the first command sequence 21 for the i+1-th instruction 900 immediately after the second command sequence 22 for the i-th instruction 900.

In the explanation of the second embodiment, SSD according to the second embodiment is denoted with a numeral 300, and is discriminated from the first embodiment. The SSD 300 according to the second embodiment is different from the first embodiment in only the NAND memory and the NAND controller, and thus a NAND memory according to the second embodiment is denoted with a numeral 301 and a NAND controller according to the second embodiment is denoted with a numeral 310, and are discriminated from the first embodiment.

The NAND memory 301 stores write data from the host device 200 or stores backup data or differential data in an address conversion table loaded in a work area (not illustrated). The NAND memory 301 is configured of one or more memory chips. When the NAND memory 301 is configured of a plurality of memory chips, the memory chips are driven in parallel, thereby achieving a rapid operation. The NAND memory 301 may be a two-valued memory for storing one bit per memory cell (SLC: Single Level Cell) or may be a multivalued memory for storing two or more bits per memory cell (MLC: Multi Level Cell). The NAND memory 301 as a multivalued memory will be described below.

Figure 13:
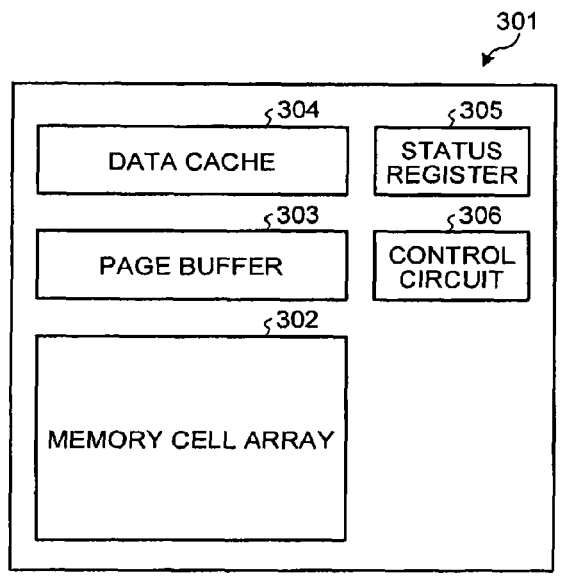
FIG. 13 is a diagram illustrating a structure of NAND memory according to a second embodiment.

FIG. 13 is a diagram illustrating a structure of the NAND memory 301.

The NAND memory 301 includes a control circuit (controller, control module) 306, a memory cell array 302, a page buffer 303, a data cache 304, and a status register 305.

The control circuit 306 entirely controls the respective units in the NAND memory 301.

In a multivalued memory, for example, the memory cell array 302 is configured such that a plurality of memory cells are arranged in a matrix, and an individual memory cell can use a higher page and a lower page for multivalued storage. The memory cell array 302 includes a plurality of physical blocks as an erase unit, and an individual physical block is configured of a plurality of physical pages (which will be called page simply) as a unit of read and write. Once being written with data, an individual memory cell holds the data in a nonvolatile manner until the data is erased, and data is difficult to overwrite.

The data cache 304 and the page buffer 303 each include a storage capacity for one page, for example. The data cache 304 is used as a buffer for exchanging data between the NAND memory 301 and the NAND controller (control unit, control module) 310, and the page buffer 303 is used by the NAND memory 301 to input and output data into and from the memory cell array 302.

Specifically, during write command execution, when being transmitted with write data from the NAND controller 310, the control circuit 306 clears the data stored in the data cache 304 and stores the write data in the data cache 304. The control circuit 306 further copies the write data stored in the data cache 304 to the page buffer 303. Then, the control circuit 306 programs the write data stored in the page buffer 303 into the memory cell array 302. During the programming, the control circuit 306 compares the programmed write data with the write data stored in the page buffer 303, and verifies whether the programming has been correctly performed.

During a read command, the control circuit 306 reads data from the memory cell array 302 to the page buffer 303. Then, the control circuit 306 clears the data stored in the data cache 304 and then copies the read data stored in the page buffer to the data cache 304. The control circuit 306 sends the read data stored in the data cache 304 to the NAND controller 310 via a data output signal (such as an RE signal).

The status register 305 stores therein status information generated by the control circuit 306. The status information stored in the status register 305 is sent to the NAND controller 310 under control of the control circuit 306.

Specifically, during write command execution or during erase command execution, the control circuit 306 receives a status read instruction (Cmd70-StatusOut) from the NAND controller 310. When receiving the status read instruction, the control circuit 306 outputs the status information stored in the status register 305 to the NAND controller 310.

For example, during write command execution, the control circuit 306 receives the status read instruction (Cmd70-StatusOut) after a write instruction (Cmd80-Adr-DataIn-Cmd10h) for the write data, and if the write data is stored in the data cache 304, outputs, as the status information, whether the write data has been successfully programmed.

When clearing the write data stored in the data cache 304, the control circuit 306 accordingly clears the status information for the write data from the status register 305. Thus, when the write data is not stored in the data cache 304, it is difficult for the control circuit 306 to output the status information for the write data.

For example, during erase command execution, the control circuit 306 receives the status read instruction (Cmd70-StatusOut) after an erase instruction (Cmd60h-Adr-CmdD0h) for an erase command, and then outputs, as the status information, whether the erase command has been successfully erased.

Figure 14:
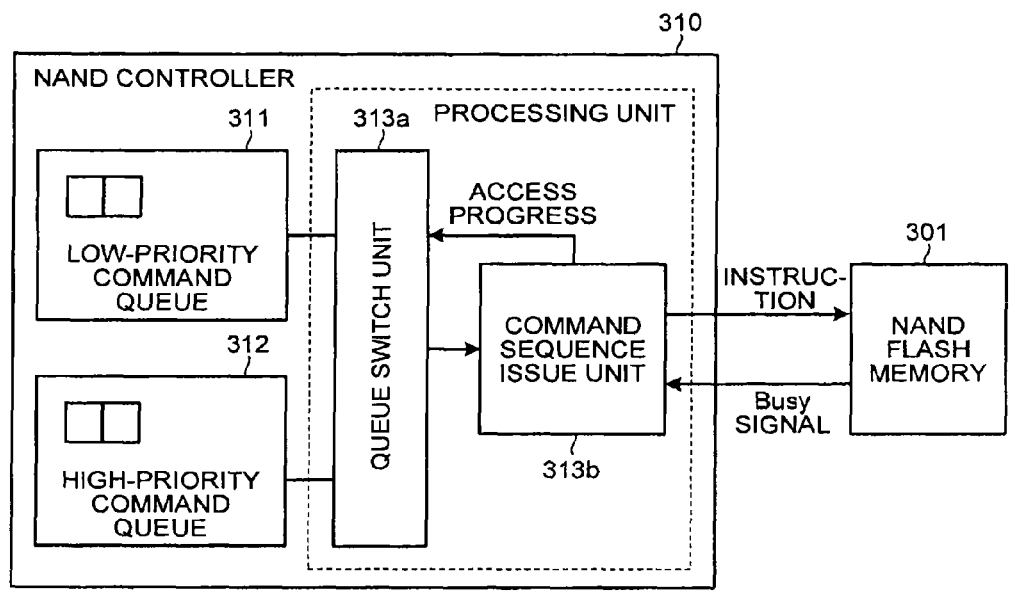
FIG. 14 is a diagram illustrating a structure of a NAND controller according to the second embodiment.

The NAND controller 310 will be described below with reference to FIG. 14. FIG. 14 is a diagram illustrating a structure of the NAND controller 310.

In the SSD 300, a command with a different priority may be requested at a different timing. The priority is an execution order in a relationship with other command during command execution, for example. In terms of the point, the NAND controller 310 has two command queues with different priorities, and has a mechanism for determining whether to switch the low-priority command queue to the high-priority command queue in an event in which a command is set in the high-priority command queue.

Specifically, the NAND controller 310 includes a low-priority command queue (first command queue) 311, a high-priority command queue (second command queue) 312, and a processing unit (processor, processing module) 313.

The low-priority command queue 311 has a lower priority than the high-priority command queue 312. That is, the low-priority command queue 311 stores therein a command with a lower priority than the command stored in the high-priority command queue 312 in terms of the command execution order. The low-priority command queue 311 can store a plurality of commands, for example. The low-priority command queue 311 has a FIFO (First In First Out) structure, for example, and moves a plurality of commands from an input position 111a to an execution position 111b (see FIG. 16A) in the storage order.

The high-priority command queue 312 has a higher priority than the lower-priority command queue 311. That is, the high-priority command queue 312 stores therein a command with a higher priority than the command stored in the low-priority command queue 311 in terms of the command execution order. The high-priority command queue 312 can store one or more commands, for example. There will be described below a case in which the high-priority command queue 312 stores one command by way of example for a simplified explanation, but the following case is similarly applicable to a case in which the high-priority command queue 312 can store a plurality of commands.

The processing unit 313 selects either the low-priority command queue 311 or the high-priority command queue 312, and executes a command stored in the selected command queue thereby to access the NAND memory 301.

For example, when a command is not stored in the high-priority command queue 312, the processing unit 313 selects the low-priority command queue 311 and executes a command stored at the execution position 111b in the low-priority command queue 311. For example, when a write command WR0 is stored at the execution position 111b in the low-priority command queue 311 (see FIG. 16A), the processing unit 313 executes the write command WR0.

For example, when a command is stored in the high-priority command queue 312 while a command is not stored in the low-priority command queue 311, the processing unit 313 selects the high-priority command queue 312 to execute the command stored in the high-priority command queue 312. For example, when a write command WR2 is stored in the high-priority command queue 312 (see FIG. 16A), the processing unit 313 executes the write command WR2.

On the other hand, there is problematic a case in which one or more commands are stored in the low-priority command queue 311, and a command is stored in the high-priority command queue 312 while a command stored at the execution position 111b is being executed.

There will be assumed a case in which the processing unit 313 definitely terminates the processing for the command in the low-priority command queue 311 and then performs the processing for the command in the high-priority command queue 312. In this case, latency (a time up to a command response) to the high-priority command tends to be longer for the time when the processing of the low-priority command is waited to complete.

Thus, in the embodiments, when the second command is stored in the high-priority command queue 312 while the first command stored in the low-priority command queue 311 is being executed, the processing unit 313 performs (executes) either interruption processing or completion processing according to an access progress situation of the first command to the NAND memory 301 at the timing when the second command is stored in the high-priority command queue 312. The interruption processing is to interrupt the execution of the first command and to execute the second command. The completion processing is to complete the execution of the first command. That is, the processing of the first command in the low-priority command queue 311 is not necessarily completed, and the first command is controlled to be switched between completion and interruption in consideration of the access progress situation of the first command to the NAND memory 301.

Specifically, the processing unit 313 includes a queue switch unit 313a and a command sequence issue unit 313b.

The queue switch unit 313a monitors the commands stored in the low-priority command queue 311 and the high-priority command queue 312, selects either the low-priority command queue 311 or the high-priority command queue 312 according to the command storage situation if the command sequence issue unit 313b has not issued a command sequence, and notifies the contents of the commands stored in the selected command queue to the command sequence issue unit 313b.

When receiving the notification of the contents of the command to be executed from the queue switch unit 313a, the command sequence issue unit 313b issues a command sequence according to the contents of the command to be executed. The command sequence issue unit 313b performs access processing of generating an instruction or data to be supplied to the NAND memory 301 and supplying it to the NAND memory 301 according to the issued command sequence. The command sequence issue unit 313b notifies the fact that it has issued a command sequence to the queue switch unit 313a.

On the other hand, after the command sequence issue unit 313b has issued a command sequence, when the second command is stored in the high-priority command queue 312 while the first command stored in the low-priority command queue 311 is being executed, for example, the queue switch unit 313a inquires, to the command sequence issue unit 313b, an access progress situation of the first command to the NAND memory 301 at the timing when the second command is stored in the high-priority command queue 312.

The command sequence issue unit 313b determines the access progress situation in response to the inquiry. That is, after the command sequence has been issued, the command sequence issue unit 313b receives a Busy signal from the NAND memory 301 one by one. The command sequence issue unit 313b determines the access progress situation depending on whether a value of the Busy signal is "Ready" or "Busy."

For example, when the value of the Busy signal is "Ready" prior to "Busy" after the command sequence has been issued, the command sequence issue unit 313b determines that the access progress situation is before the busy state starts (for example, "before NANDBusy" illustrated in FIG. 21).

For example, when the value of the Busy signal is "Busy", the command sequence issue unit 313b determines that the access progress situation is during the busy state (for example, "during NANDBusy" illustrated in FIG. 21).

For example, when the value of the Busy signal is "Ready" after "Busy" after the command sequence has been issued, the command sequence issue unit 313b determines that the access progress situation is after the busy state ends (for example, "after NANDBusy" illustrated in FIG. 21).

The command sequence issue unit 313b notifies the determined access progress situation to the queue switch unit 313a.

When receiving the notification of the access progress situation, the queue switch unit 313a performs either the interruption processing or the completion processing on the running first command according to the access progress situation.

That is, when performing the interruption processing, the queue switch unit 313a switches the state where the low-priority command queue 311 is selected to the state where the high-priority command queue 312 is selected, thereby interrupting the first command and executing the second command. At this time, the queue switch unit 313a may hold an interruption state flag indicating that the first command is being interrupted.

Alternatively, when performing the completion processing, the queue switch unit 313a maintains the state where the low-priority command queue 311 is selected, thereby completely executing the first command. Then, after the first command is completed by the completion processing, the queue switch unit 313a starts executing the second command. For example, when receiving the notification that the first command has been completed from the command sequence issue unit 313b, the queue switch unit 313a switches the state where the low-priority command queue 311 is selected to the state where the high-priority command queue 312 is selected, thereby starting executing the second command.

For example, the queue switch unit 313a performs either the interruption processing or the completion processing according to an access progress situation to the NAND memory 301 associated with the execution of the first command, and a kind of the first command. For example, the queue switch unit 313a performs the interruption processing when the first command is an erase command or a read command, and performs the completion processing when the first command is a write command.

More specifically, when the first command is a write command and the access progress situation to the NAND memory 301 is before the busy state of the NAND memory 301 starts, the queue switch unit 313a performs the interruption processing. When the first command is a write command and the access progress situation to the NAND memory 301 is after the busy state of the NAND memory 301 starts, the queue switch unit 313a performs the completion processing.

Alternatively, there will be assumed a case in which when performing the interruption processing, the processing unit 313 forcibly discards the processing of the command in the low-priority command queue 311 and then performs the processing of the command in the high-priority command queue 312. In this case, since the processing of the command in the low-priority command queue 311 is forcibly discarded, throughput of the processing of the command in the low-priority command queue 311 tends to decrease.

For the fact, according to the second embodiment, after the execution of the first command is interrupted by the interruption processing and the execution of the second command is completed, the processing unit 313 performs either continuation processing or retry processing according to the access progress situation of the first command to the NAND memory 301 at the interruption timing. The continuation processing is to continue the execution of the first command from the processing at the interruption. The retry processing is to retry the execution of the first command from the initial processing.

For example, after the execution of the first command is interrupted by the interruption processing and the execution of the second command is completed, the queue switch unit 313a switches the state where the high-priority command queue 312 is selected to the state where the low-priority command queue 311 is selected, thereby notifying, to the command sequence issue unit 313b, the fact that the interrupted first command is to be executed.

Accordingly, the command sequence issue unit 313b determines the access progress situation to the NAND memory 301 at the timing when the execution of the first command is interrupted by the interruption processing. At this time, the command sequence issue unit 313b may use the access progress situation used for the interruption processing as the determined access progress situation, for example. For example, when the access progress situation to the NAND memory 301 is before the busy state of the NAND memory 301 ends, the command sequence issue unit 313b initially issues the command sequence of the first command thereby to perform the retry processing of retrying the execution of the first command from the initial processing. Alternatively, for example, when the access progress situation to the NAND memory 301 is after the busy state of the NAND memory 301 ends, the command sequence issue unit 313b issues the command sequence of the first command from the interruption point, thereby performing the continuation processing of continuing the execution of the first command from the processing at the interruption.

For example, the command sequence issue unit 313b performs either the continuation processing or the retry processing according to the access progress situation of the first command to the NAND memory 301 at the interruption timing, and a combination of a kind of the first command and a kind of the second command. For example, when the combination of a kind of the first command and a kind of the second command includes an erase command and a read command, the command sequence issue unit 313b performs the continuation processing, and when the combination of a kind of the first command and a kind of the second command does not include an erase command and a read command, performs the retry processing.

More specifically, when the combination of a kind of the first command and a kind of the second command includes an erase command and a read command and the access progress situation to the NAND memory 301 is before the busy state of the NAND memory 301 ends, the command sequence issue unit 313b performs the retry processing. When the combination of a kind of the first command and a kind of the second command includes an erase command and a read command and the access progress situation to the NAND memory 301 is after the busy state of the NAND memory 301 ends, the command sequence issue unit 313b performs the continuation processing.

For example, when the running command is a write command or an erase command, the command sequence issue unit 313b determines that the running command has been completed in response to the reception of a response (such as status information) for the status read instruction from the NAND memory 301. Alternatively, for example, when the running command is a read command, the command sequence issue unit 313b determines that the running command has been completed in response to the reception of a final address of the data to be read from the NAND memory 301. The command sequence issue unit 313b determines that the running command has been completed, and then notifies the fact to the queue switch unit 313a.

Figure 15:
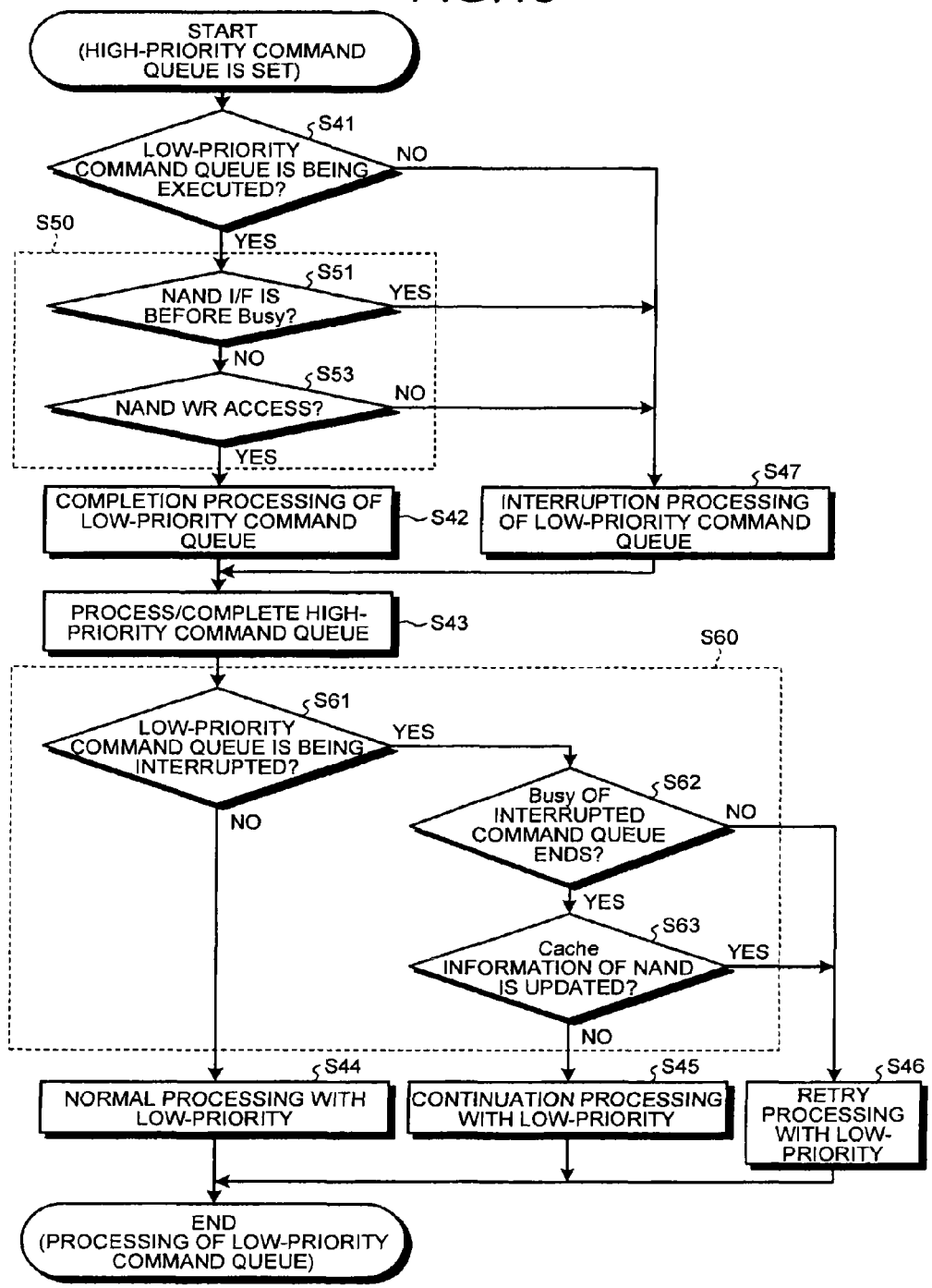
FIG. 15 is a flowchart illustrating operations of a memory system according to the second embodiment.

The operations of the SSD 300 will be described below with reference to FIG. 15. FIG. 15 is a flowchart illustrating the operations of the SSD 300.

In step S41, the NAND controller 310 determines whether the processing of the command (the first command) in the low-priority command queue 311 is being executed in response to the storage of the second command in the high-priority command queue 312. When the processing of the command in the low-priority command queue 311 is being executed (Yes in step S41), the NAND controller 310 proceeds to step S50, and when the processing of the command in the low-priority command queue 311 is not being executed (No in step S41), proceeds to step S47.

In step S50, the NAND controller 310 makes a stop determination for selecting either the completion processing or the interruption processing according to the access progress situation of the first command to the NAND memory 301 at the timing when the second command is stored in the high-priority command queue 312. In the completion processing, access processing by the first command which is being executed in the low-priority command queue is completed, and then the second command in the high-priority command queue is executed. In the interruption processing, the access processing by the first command which is being executed in the low-priority command queue is interrupted and then the second command in the high-priority command queue is executed.

Specifically, in step S50, the NAND controller 310 performs the following processing in step S51 to step S53.

In step S51, the NAND controller 310 determines whether the access progress situation to the NAND memory 301 is after the busy state starts. When the access progress situation is before the busy state starts, the NAND controller 310 proceeds to step S47, and when the access progress situation is not before the busy state starts (or after the busy state starts), proceeds to step S53.

In step S53, the NAND controller 310 determines whether a kind of the running first command is a write command (WR access). When the kind of the first command is a write command (Yes in step S53), the NAND controller 310 proceeds to step S42, and when the kind of the first command is not a write command (No in step S53), proceeds to step S47.

In step S42, the NAND controller 310 performs the completion processing. That is, the NAND controller 310 completes the execution of the first command in the low-priority command queue 311.

In step S47, the NAND controller 310 performs the interruption processing. That is, the NAND controller 310 interrupts the execution of the first command in the low-priority command queue 311. At this time, the NAND controller 310 may generate and hold an interruption state flag indicating that the execution of the first command is being interrupted.

In step S43, the NAND controller 310 executes the second command in the high-priority command queue 312 to complete the execution of the second command.

In step S60, the NAND controller 310 makes a return determination for performing any one of the normal processing, the continuation processing and the retry processing according to the access progress situation of the first command to the NAND memory 301 at the interruption timing. In the normal processing, the processing of the low-priority command queue is normally performed corresponding to the case where the completion processing (step S42) is performed based on the determination that the first command is to be completed in the stop determination (step S50). In the continuation processing, the access processing after the interruption by the interruption processing (step S47) is continued corresponding to the case where the interruption processing (step S47) is performed based on the determination that the first command is to be interrupted in the stop determination (step S50). In the retry processing, the first command in the low-priority command queue 311, before being switched to the high-priority command queue 312, is subjected to the retry processing corresponding to the case where the interruption processing (step S47) is performed based on the determination that the first command is to be interrupted in the stop determination (step S50).

Specifically, in step S60, the NAND controller 310 performs the following processing in step S61 to step S63.

In step S61, the NAND controller 310 determines whether the low-priority command queue 311 is being interrupted with reference to the interruption state flag, for example. When the low-priority command queue 311 is not being interrupted or when the processing of the first command has been completed (No in step S61), the NAND controller 310 proceeds to step S44, and when the low-priority command queue 311 is being interrupted (Yes in step S61), proceeds to step S62.

In step S62, the NAND controller 310 determines whether the access progress situation of the first command to the NAND memory 301 at the interruption timing is after the busy state ends (the busy state has ended). When the access progress situation is after the busy state ends (Yes in step S62), the NAND controller 310 proceeds to step S63, and when the access progress situation is not after the busy state ends, or before the busy state ends (No in step S62), proceeds to step S46.

In step S63, the NAND controller 310 determines whether the processing of the first command in the low-priority command queue 311 is influenced by the fact that the processing executed by the second command in the high-priority command queue 312 is an access for updating the internal information (such as cache or status information) in the NAND memory 301.

For example, when the combination of the kind of the first command in the low-priority command queue 311 and the kind of the second command in the high-priority command queue 312 includes an erase command and a read command, the NAND controller 310 determines that the processing of the first command is not influenced by the update access to the internal information in the NAND memory 301 (No in step S63), and proceeds to step S45.

Alternatively, when the combination of the kind of the first command and the kind of the second command does not include an erase command and a read command, the NAND controller 310 determines that the processing of the first command is influenced by the update access to the internal information in the NAND memory 301 (Yes in step S63), and proceeds to step S46.

In step S44, the NAND controller 310 performs the normal processing. That is, the NAND controller 310 executes a command stored subsequent to the first command in the low-priority command queue 311.

In step S45, the NAND controller 310 performs the continuation processing. That is, the NAND controller 310 continues the execution of the first command from the processing at the interruption, and completes the same.

In step S46, the NAND controller 310 performs the retry processing. That is, the NAND controller 310 starts retrying the execution of the first command from the initial processing, and completes the same.

The operations associated with the stop determination (step S50) and the return determination (step S60) will be described below by way of specific cases.

Figure 16A:
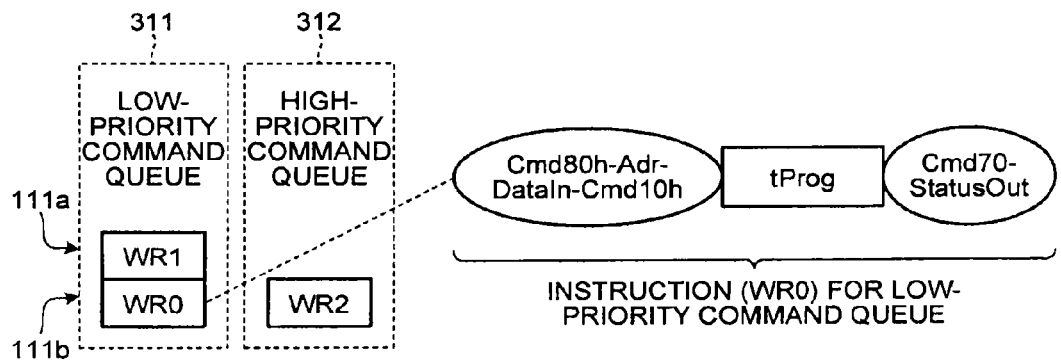
FIG. 16A is a diagram illustrating operations of the memory system according to the second embodiment.

The first case is that the write command WR2 is stored in the high-priority command queue 312 while the write command WR0 in the low-priority command queue 311 is being executed as illustrated in FIG. 16A. The first case corresponds to the normal processing (step S44) illustrated in FIG. 15, for example.

Figure 16B:
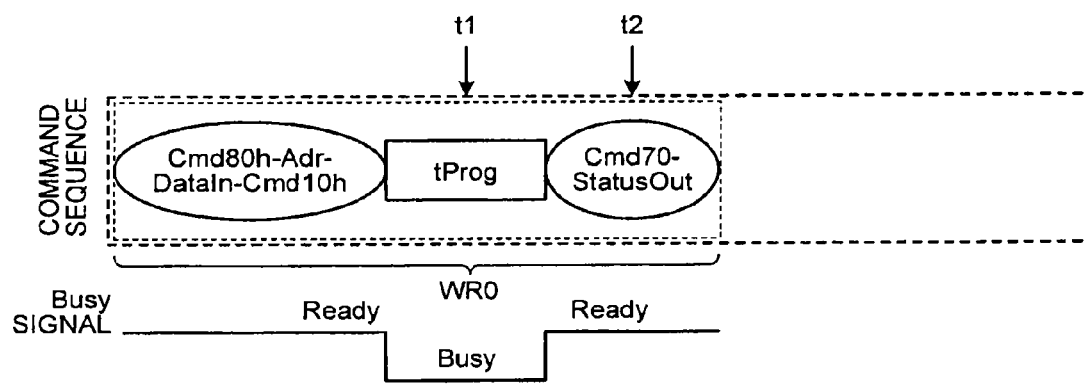
FIG. 16B is a diagram illustrating operations of the memory system according to the second embodiment.

As illustrated in FIG. 16B, the command sequence of the write command WR0 in the low-priority command queue 311 is scheduled to sequentially process a write instruction (Cmd80h-Adr-DataIn-Cmd10h), access processing (tProg) such as transfer of the write data from the NAND controller 310 to the NAND memory 301, and a status read instruction (Cmd70-StatusOut). The value of the Busy signal is "Ready" before and after the access processing (tProg), and is scheduled to enter "Busy" during the access processing (tProg).

Figure 16C:
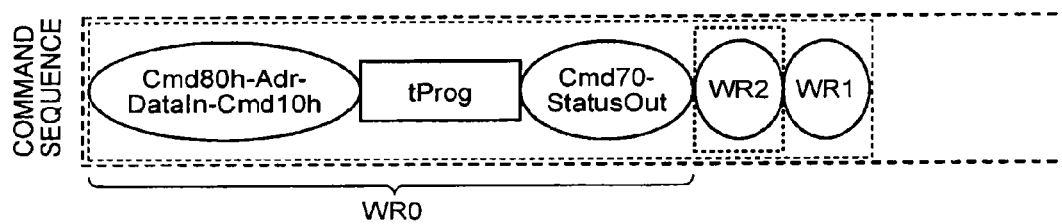
FIG. 16C is a diagram illustrating operations of the memory system according to the second embodiment.

At this time, when the write command WR2 is stored in the high-priority command queue 312 at timing t1 or timing t2 after the "Busy" state starts, the entire command sequence of the command WR0 (that is, the write instruction, the access processing, and the status read instruction) is completed and then the write command WR2 in the high-priority command queue 312 starts being executed as illustrated in FIG. 16C.

If the write command WR0 in the low-priority command queue 311 is interrupted when the write command WR2 is stored in the high-priority command queue 312 at timing t1 or timing t2, even when the write command WR0 in the low-priority command queue 311 retries to start from the interruption point after the completion of the write command WR2 in the high-priority command queue 312, the NAND memory 301 is overwritten. The overwriting is difficult to execute in the previously written memory cell as described above, and thus the NAND memory cell 301 needs to search and write into an alternate memory cell, but the memory cell previously written in mid-course is discarded as an invalid memory cell. Thereby, the NAND memory 301 uselessly spends the resource.

To the contrary, in the embodiments, when the write command WR2 is stored in the high-priority command queue 312 at timing t1 or timing t2 after the access processing (tProg) is started, the command sequence of the running write command WR0 is entirely completed without interruption in consideration of the characteristics of the NAND memory 301. Thereby, the NAND memory 301 can reduce useless consumption of the resource.

Figure 17A:
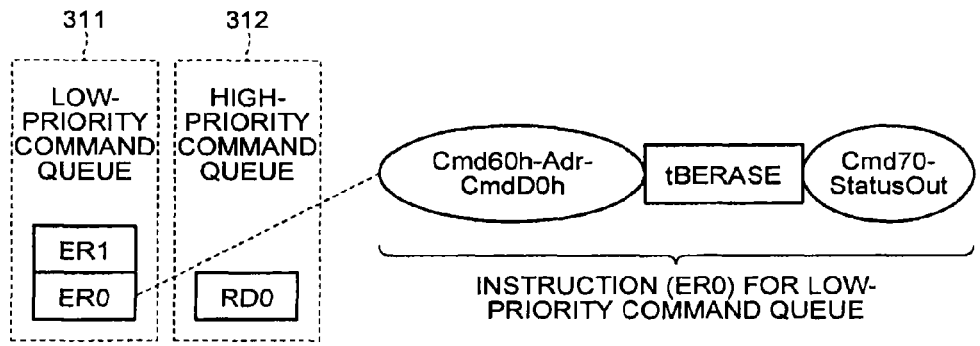
FIG. 17A is a diagram illustrating operations of the memory system according to the second embodiment.

The second case is that a read command RD0 is stored in the high-priority command queue 312 while an erase command ER0 in the low-priority command queue 311 is being executed as illustrated in FIG. 17A. The second case corresponds to the continuation processing (step S45) illustrated in FIG. 15, for example.

Figure 17B:
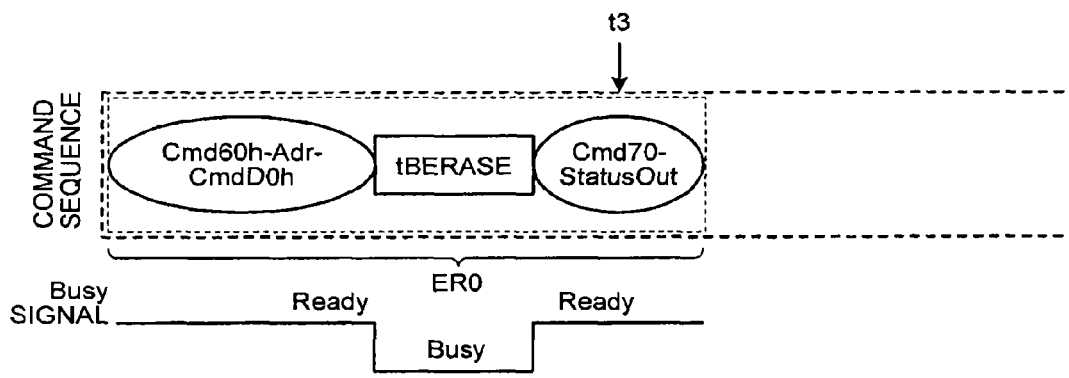
FIG. 17B is a diagram illustrating operations of the memory system according to the second embodiment.
Figure 17C:
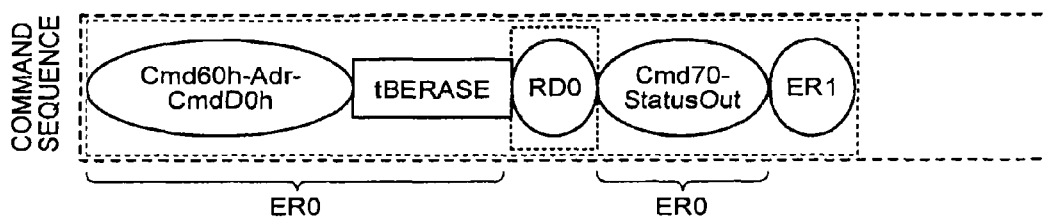
FIG. 17C is a diagram illustrating operations of the memory system according to the second embodiment.

As illustrated in FIG. 17B, the command sequence of the erase command ER0 in the low-priority command queue 311 is scheduled to sequentially process an erase instruction (Cmd60h-Adr-CmdF0h), access processing (tBERASE) associated with the erase operation from the NAND controller 310 to the NAND memory 301, and a status read instruction (Cmd70-StatusOut). The value of the Busy signal is "Ready" before and after the access processing (tBERASE), and is scheduled to enter "Busy" during the access processing (tBERASE).

At this time, when the read command RD0 is stored in the high-priority command queue 312 at timing t3 after the "Busy" state ends, the erase instruction and the access processing in the command sequence of the erase command ER0 are completed, and then the erase command ER0 is interrupted and the execution of the read command RD0 in the high-priority command queue 312 is started. Then, when the execution of the read command RD0 in the high-priority command queue 312 is completed, the processing is continued, restarted and completed from the status read instruction in the command sequence of the erase command ER0 being interrupted.

In the present case, since the internal information (such as cache or status information) of the NAND memory 301 is not discarded when being interrupted in the low-priority command queue 311 by the processing of the read command RD0 in the high-priority command queue 312, the execution of the read command RD0 in the high-priority command queue 312 is completed after interruption, and then the continuation processing of the erase command ER0 being interrupted is enabled.

The third case is that the erase command ER0 is stored in the high-priority command queue 312 while the read command RD0 in the low-priority command queue 311 is being executed. The third case corresponds to the continuation processing (step S45) illustrated in FIG. 15, for example.

Figure 18A:
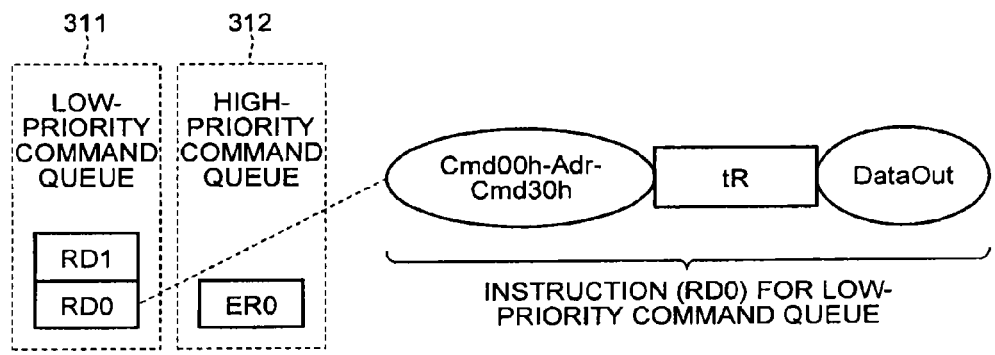
FIG. 18A is a diagram illustrating operations of the memory system according to the second embodiment.
Figure 18B:
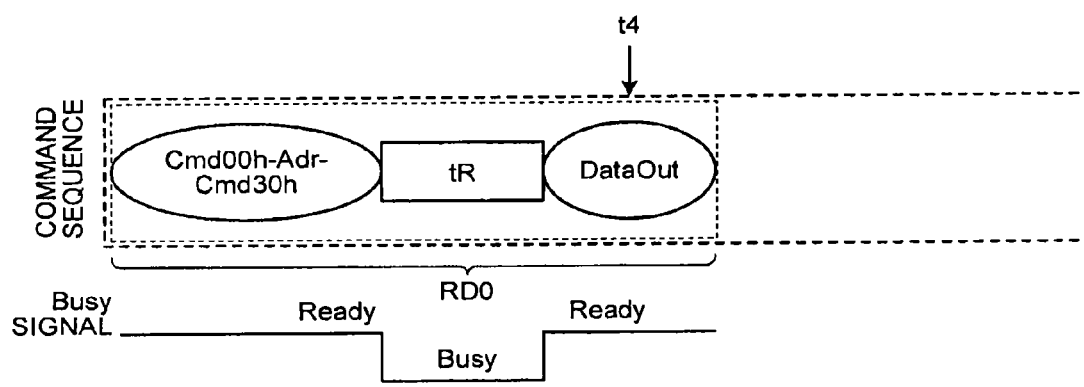
FIG. 18B is a diagram illustrating operations of the memory system according to the second embodiment.

As illustrated in FIG. 18B, the command sequence of the read command RD0 in the low-priority command queue 311 is scheduled to sequentially process a read instruction (Cmd00h-Adr-Cmd30h), access processing (tR) associated with the data read operation from the NAND controller 310 to the NAND memory 301, and data transfer processing (DataOut) from the NAND memory 301 to the NAND controller 310. The value of the Busy signal is "Ready" before and after the access processing (tR), and is scheduled to enter "Busy" during the access processing (tR).

Figure 18C:
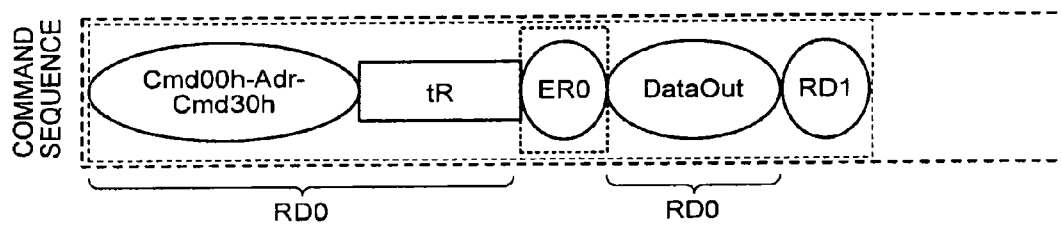
FIG. 18C is a diagram illustrating operations of the memory system according to the second embodiment.

At this time, when the erase command ER0 is stored in the high-priority command queue 312 at timing t4 after the "Busy" state ends, as illustrated in FIG. 18C, the read instruction and the access processing in the command sequence of the read command RD0 are completed, and then the read command RD0 is interrupted, and the erase command ER0 in the high-priority command queue 312 starts being executed. Then, the execution of the erase command ER0 in the high-priority command queue 312 is completed, and then the processing is continued, restarted and completed from the data transfer processing in the command sequence of the read command RD0 being interrupted.

In the present case, since the internal information (such as cache or status information) in the NAND memory 301 is not discarded when being interrupted in the low-priority command queue 311 by the processing of the erase command ER0 in the high-priority command queue 312, the execution of the erase command ER0 in the high-priority command queue 312 is completed after interruption, and then the continuous processing of the read command RD0 being interrupted is enabled.

Figure 19A:
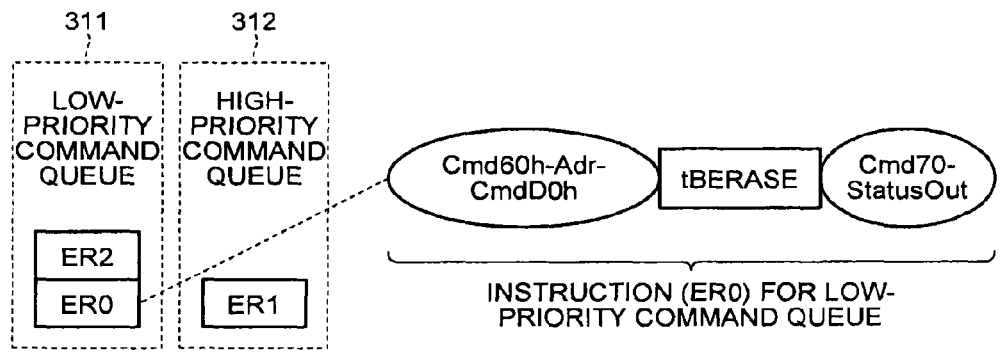
FIG. 19A is a diagram illustrating operations of the memory system according to the second embodiment.

The fourth case is that an erase command ER1 is stored in the high-priority command queue 312 while the erase command ER0 in the low-priority command queue 311 is being executed as illustrated in FIG. 19A. The fourth case corresponds to the retry processing (step S46) illustrated in FIG. 15, for example.

Figure 19B:
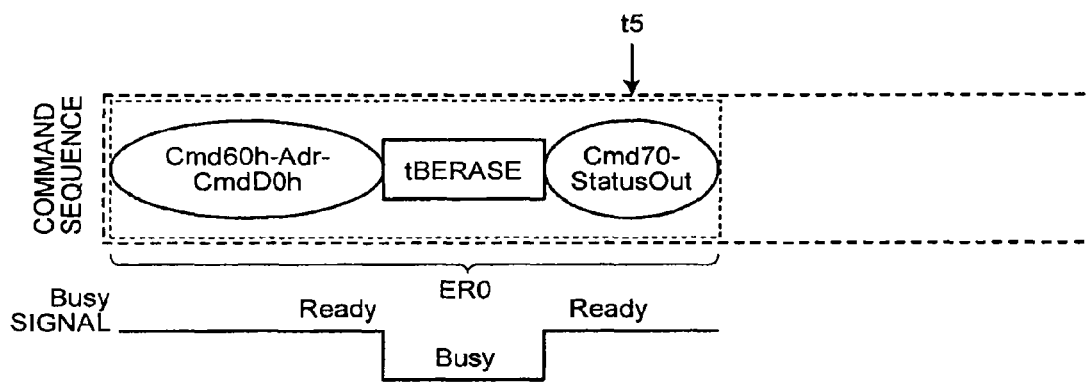
FIG. 19B is a diagram illustrating operations of the memory system according to the second embodiment.

As illustrated in FIG. 19B, the command sequence of the erase command ER0 in the low-priority command queue 311 is scheduled to sequentially process an erase instruction (Cmd60h-Adr-CmdD0h), access processing (tBERASE)

associated with the erase processing from the NAND controller 310 to the NAND memory 301, and a status read instruction (Cmd70-StatusOut). The value of the Busy signal is "Ready" before and after the access processing (tBERASE), and is scheduled to enter "Busy" during the access processing (tBERASE).

Figure 19C:
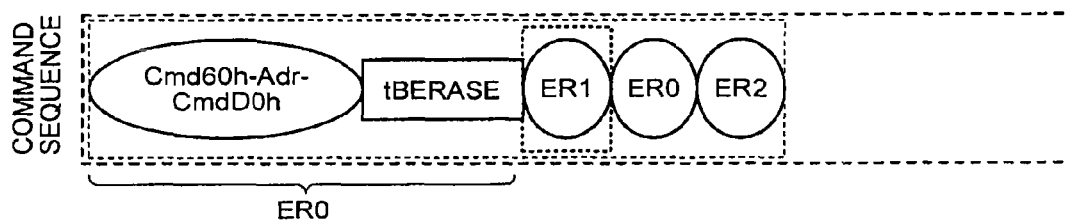
FIG. 19C is a diagram illustrating operations of the memory system according to the second embodiment.

At this time, when the erase command E1 is stored in the high-priority command queue 312 at timing t5 after the "Busy" state ends, as illustrated in FIG. 19C, the erase command ER0 is interrupted, and then the execution of the erase command ER1 in the high-priority command queue 312 is started. Then, the execution of the erase command ER1 in the high-priority command queue 312 is completed, and then the processing is started and completed to retry the processing from the initial erase instruction in the command sequence of the erase command ER0 being interrupted.

In the present case, since the internal information (such as cache or status information) in the NAND memory 301 is discarded when being interrupted in the low-priority command queue 311 by the processing of the erase command ER1 in the high-priority command queue 312, the execution of the erase command ER1 in the high-priority command queue 312 is completed after interruption, and then the retry processing of the erase command ER0 being interrupted is needed.

Figure 20A:
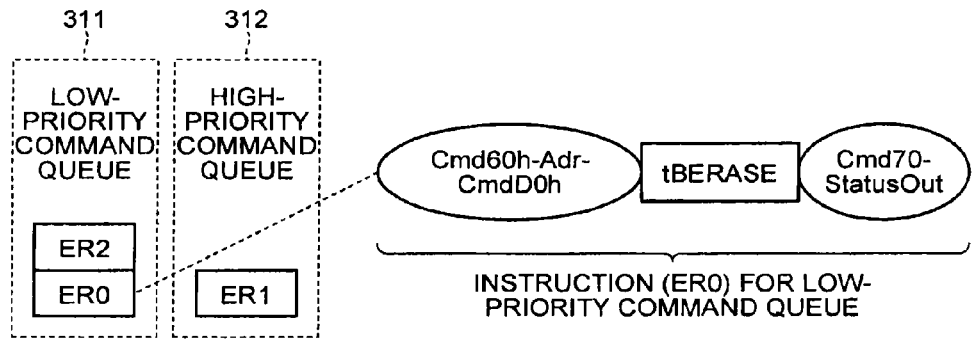
FIG. 20A is a diagram illustrating operations of the memory system according to the second embodiment.

The fifth case is that the erase command ER1 is stored in the high-priority command queue 312 while the erase command ER0 in the low-priority command queue 311 is being executed as illustrated in FIG. 20A. The fifth case corresponds to the retry processing (step S46) illustrated in FIG. 15, for example.

Figure 20B:
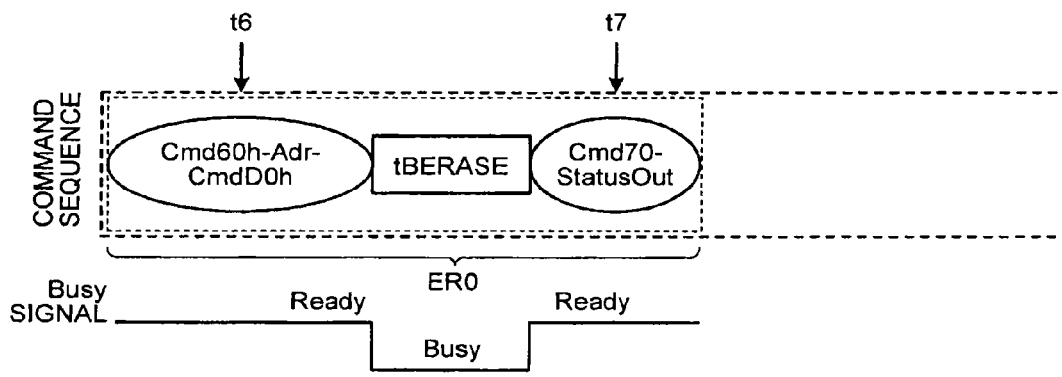
FIG. 20B is a diagram illustrating operations of the memory system according to the second embodiment.

As illustrated in FIG. 20B, the command sequence of the erase command ER0 in the low-priority command queue 311 is scheduled to sequentially process an erase instruction (Cmd60h-Adr-CmdD0h), access processing (tBERASE) associated with the erase operation from the NAND controller 310 to the NAND memory 301, and a status read instruction (Cmd70 -StatusOut). The value of the Busy signal is "Ready" before and after the access processing (tBERASE), and is scheduled to enter "Busy" during the access processing (tBERASE).

Figure 20C:
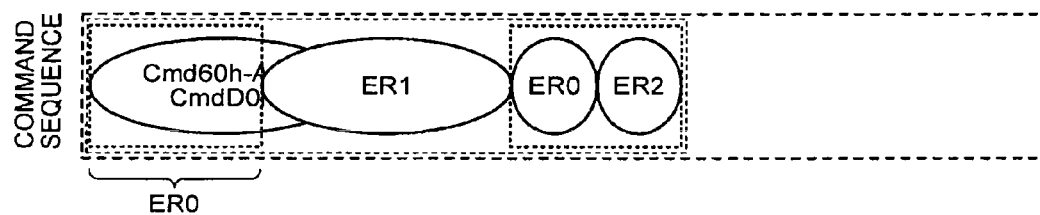
FIG. 20C is a diagram illustrating operations of the memory system according to the second embodiment.

At this time, when the erase command ER1 is stored in the high-priority command queue 312 at timing t6 before the "Busy" state starts, as illustrated in FIG. 20C, the erase command ER0 is interrupted, and the erase command ER1 in the high-priority command queue 312 starts being executed. Then, the execution of the erase command ER1 in the high-priority command queue 312 is completed, and then the processing is started and completed to retry the processing from the initial erase instruction in the command sequence of the erase command ER0 being interrupted.

Figure 20D:
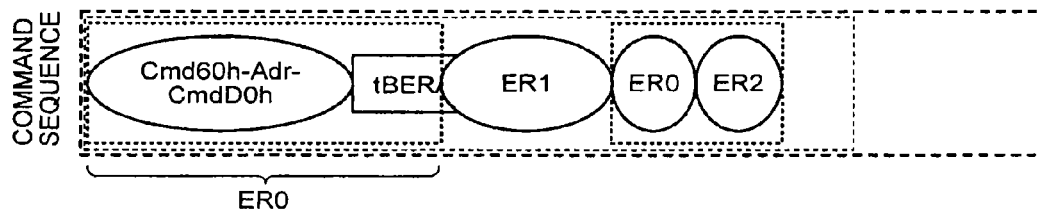
FIG. 20D is a diagram illustrating operations of the memory system according to the second embodiment.

Alternatively, when the erase command ER1 is stored in the high-priority command queue 312 at timing t7 during the "Busy" state, as illustrated in FIG. 20D, the erase command ER0 is interrupted, and then the erase command ER1 in the high-priority command queue 312 starts being executed. Then, the execution of the erase command ER1 in the high-priority command queue 312 is completed, and then the processing is started and completed to retry the processing from the initial erase instruction in the command sequence of the erase command ER0 being interrupted.

In the present case, since the internal information (such as cache or status information) in the NAND memory 301 is discarded when being interrupted in the low-priority command queue 311 by the processing of the erase command ER1 in the high-priority command queue 312, the execution of the erase command ER1 in the high-priority command queue 312 is completed after interruption, and then the retry processing of the erase command ER0 being interrupted is needed.

In this way, the first case to the fifth case have been described by way of example for the operations associated with the stop determination (step S50) and the return determination (step S60), but various cases may be further employed. FIG. 21 illustrates various cases.

There will be assumed a case in which the processing unit 313 definitely completes the processing of the command in the low-priority command queue 311, and then performs the processing of the command in the high-priority command queue 312. In this case, latency (a time up to a command response) to the high-priority command tends to be longer for the time when the processing of the low-priority command is waited to complete.

To the contrary, in the second embodiment, when the second command is stored in the high-priority command queue 312 while the first command stored in the low-priority command queue 311 is being executed, the processing unit 313 performs either the interruption processing or the completion processing according to the access progress situation of the first command to the NAND memory 301 at the timing when the second command is stored in the high-priority command queue 312. The interruption processing is to interrupt the execution of the first command and to execute the second command. The completion processing is to complete the execution of the first command. Thereby, latency (a time up to a command response) to the high-priority command can be further reduced than the execution of the first command is definitely completed.

In the second embodiment, the processing unit 313 performs either the interruption processing or the completion processing according to the access progress situation to the NAND memory 301 associated with the execution of the first command, and the kind of the first command. Thereby, in terms of the stop of the first command, proper processing can be performed in consideration of both the access progress situation and the kind of the first command.

For example, in the second embodiment, the processing unit 313 performs the interruption processing when the first command is an erase command or a read command, and performs the completion command when the first command is a write command. Thereby, the interruption processing and the completion processing can be switched in consideration of the characteristics of the NAND memory 301 associated with the command execution.

Alternatively, there will be assumed a case in which the interruption processing is performed when the first command is a write command and the access progress situation to the NAND memory 301 is after the busy state of the NAND memory starts. In this case, even when the first command (the write command) in the low-priority command queue 311 is tried to start from the interruption point after the execution of the second command in the high-priority command queue 312 is completed, the NAND memory 301 is overwritten. Since the previously-written memory cell is difficult to overwrite, the NAND memory 301 searches and writes into an alternate memory cell, but the memory cell previously written in mid-course is discarded as a useless memory cell. Thereby, the resource in the NAND memory 301 is uselessly spent.

Alternatively, there will be assumed a case in which the completion processing is performed when the first command is a write command and the access progress situation to the NAND memory 301 is before the busy state of the NAND memory 301 starts. In this case, the first command (the write command) in the low-priority command queue 311 can be started from the interruption point after the execution of the second command in the high-priority command queue 312 is completed. That is, since the memory cell in the NAND memory 301 is not written before the busy state starts, the memory cell can be written not overwritten. That is, the completion processing is performed in this case, and thus the execution of the first command is uselessly completed and latency (a time up to a command response) to the high-priority command tends to be longer.

To the contrary, in the second embodiment, the processing unit 313 performs the interruption processing when the first command is a write command and the access progress situation to the NAND memory 301 is before the busy state of the NAND memory 301 starts. Thereby, the command sequence of the running first command (the write command) is interrupted in consideration of the characteristics of the NAND memory 301, and thus latency to the high-priority command can be reduced. The processing unit 313 performs the completion processing when the first command is a write command and the access progress situation to the NAND memory 301 is after the busy state of the NAND memory 301 starts. That is, after the execution of the first command is completed by the completion processing, the processing unit 313 starts executing the second command. Thereby, the command sequence of the running first command (the write command) can be entirely completed without interruption in consideration of the characteristics of the NAND memory 301, and thus useless consumption of the resource in the NAND memory 301 can be reduced. That is, according to the second embodiment, latency to the high-priority command can be reduced, and the useless consumption of the resource in the NAND memory 301 can be reduced.

Alternatively, there will be assumed a case in which in the interruption processing, the processing unit 313 forcibly discards the processing of the first command in the low-priority command queue 311 and then performs the processing of the second command in the high-priority command queue 312. In this case, the processing of the first command in the low-priority command queue 311 is forcibly discarded, and thus throughput of the processing of the first command in the low-priority command queue 311 tends to decrease.

To the contrary, in the second embodiment, the processing unit 313 performs either the continuation processing or the retry processing according to the access progress situation of the first command to the NADN memory 301 at the interruption timing after the execution of the first command is interrupted by the interruption processing and the execution of the second command is completed. The continuation processing is to continue the execution of the first command from the processing at the interruption. The retry processing is to retry the execution of the first command from the initial processing. Thereby, the first command can be possibly continued from the processing at the interruption in consideration of the characteristics of the NAND memory 301 or whether the internal state of the NAND memory 301 is discarded. Consequently, throughput of the first command in the low-priority command queue 311 can be enhanced.

According to the second embodiment, the processing unit 313 performs the retry processing when the access progress situation to the NAND memory 301 is before the busy state of the NAND memory 301 ends, and performs the continuation processing when the access progress situation to the NAND memory 301 is after the busy state of the NAND memory 301 ends. Thereby, the first command can be possibly continued from the processing at the interruption in consideration of the access progress situation.

According to the second embodiment, the processing unit 313 performs either the continuation processing or the retry processing according to the access progress situation of the first command to the NAND memory 301 at the interruption timing and the combination of the kind of the first command and the kind of the second command. Thereby, proper processing can be performed in consideration of both the access progress situation and the combination of the kind of the first command and the kind of the second command in terms of the return to the execution of the first command.

According to the second embodiment, the processing unit 313 performs the continuation processing when the combination of the kind of the first command and the kind of the second command includes an erase command and a read command, and performs the retry processing when the combination of the kind of the first command and the kind of the second command does not include an erase command and a read command. Thereby, the first command can be possibly continued from the processing at the interruption in consideration of the characteristics of the NAND memory 301 or whether the internal state of the NAND memory 301 is discarded.

According to the second embodiment, the processing unit 313 performs the retry processing when the combination of the kind of the first command and the kind of the second command includes an erase command and a read command and the access progress situation to the NAND memory 301 is before the busy state of the NAND memory 301 ends. The processing unit 313 performs the continuation processing when the combination of the kind of the first command and the kind of the second command includes an erase command and a read command and the access progress situation to the NAND memory 301 is after the busy state of the NAND memory 301 ends. Thereby, when the internal state of the NAND memory 301 is not discarded, the first command can be continued from the processing at the interruption in consideration of both the access progress situation and the combination of the kind of the first command and the kind of the second command.

The second embodiment has exemplified that the status read instruction (Cmd70-StatusOut) is executed after the access processing (tProg) is completed in the command sequence of the write command (see FIG. 16), but the status read instruction may be started during the access processing and may be repeated as a status polling instruction.

Similarly, there has been exemplified above the case where the status read instruction (Cmd70-StatusOut) is executed after the access processing (tBERASE) is completed in the command sequence of the erase command (see FIG. 17B), but the status read instruction may be started during the access processing and may be repeated as a status polling instruction.

Figure 22:
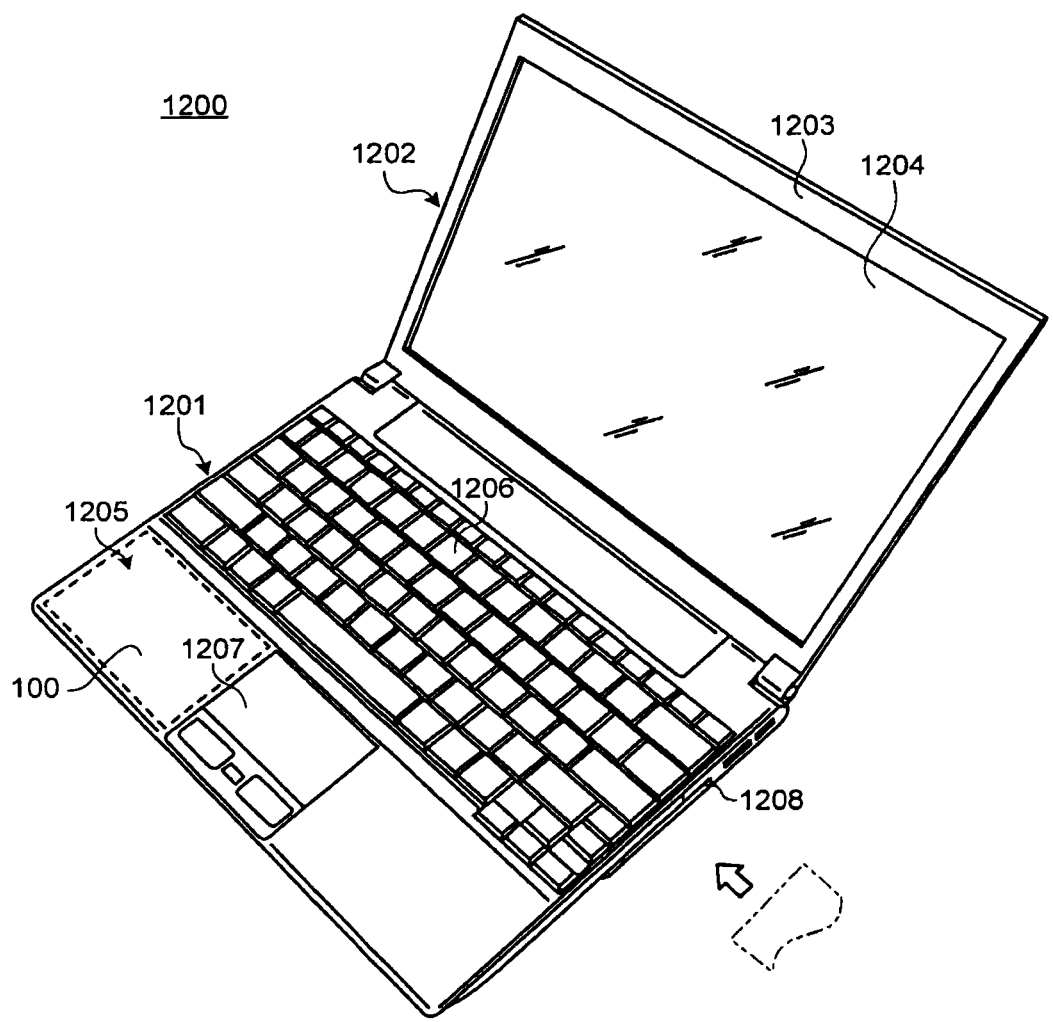
FIG. 22 is a perspective view illustrating an exemplary personal computer mounting an SSD according to the first embodiment thereon.

FIG. 22 is a perspective view illustrating an exemplary personal computer 1200 mounting the SSD 100 according to the first embodiment thereon. The personal computer 1200 can mount the SSD 300 according to the second embodiment thereon instead of the SSD 100 according to the first embodiment. The personal computer 1200 includes a main body 1201 and a display unit 1202. The display unit 1202 includes a display housing 1203, and a display device 1204 housed in the display housing 1203.

The main body 1201 includes a casing 1205, a keyboard 1206, and a touch pad 1207 as a pointing device. The casing 1205 houses a main circuit board, an ODD (Optical Disk device) unit, a card slot, the SSD 100 and the like therein.

The card slot is provided adjacent to the peripheral wall of the casing 1205. The peripheral wall is provided with an opening 1208 opposite to the card slot. A user can insert an additional device into the card slot from the outside of the casing 1205 via the opening 1208.

The SSD 100 may be used while being mounted inside the personal computer 1200 in place of a conventional HDD, or may be used as an additional device while being inserted into the card slot provided in the personal computer 1200.

FIG. 23 illustrates an exemplary system structure of the personal computer mounting the SSD thereon. The personal computer 1200 includes a CPU 1301, a north bridge 1302, a main memory 1303, a video controller 1304, an audio controller 1305, a south bridge 1309, a BIOS-ROM 1310, the SSD 100, an ODD unit 1311, an embedded controller/keyboard controller IC (EC/KBC) 1312, a network controller 1313, and the like.

The CPU 1301 is a processor provided for controlling the operations of the personal computer 1200, and executes an operating system (OS) loaded from the SSD 100 to the main memory 1303. Further, when the ODD unit 1311 enables at least one processing of the read processing and the write processing to be performed on a mounted optical disk, the CPU 1301 executes the processing.

The CPU 1301 executes the system BIOS (Basic Input Output System) stored in the BIOS-ROM 1310. The system BIOS is a program for hardware control inside the personal computer 1200.

The north bridge 1302 is a bridge device for connecting a local bus of the CPU 1301 and the south bridge 1309. The north bridge 1302 incorporates therein a memory controller for performing access control on the main memory 1303.

The north bridge 1302 has a function of making communication with the video controller 1304 via an AGP (Accelerated Graphics Port) bus or the like, and communication with the audio controller 1305.

The main memory 1303 temporarily stores programs or data, and functions as a work area of the CPU 1301. The main memory 1303 is configured of RAM, for example.

The video controller 1304 is a video reproduction controller for controlling the display unit 1202 used as a display monitor of the personal computer 1200.

The audio controller 1305 is an audio reproduction controller for controlling a speaker 1306 of the personal computer 1200.

The south bridge 1309 controls each device on a LPC (Low Pin Count) bus 1314 and each device on a PCI (Peripheral Component Interconnect) bus 1315. The south bridge 1309 controls the SSD 100 as a storage device for storing various software and data via a SATA interface.

The personal computer 1200 accesses the SSD 100 in units of sector. A write command, a read command, a cache flash command and the like are input into the SSD 100 via the SATA interface.

The south bridge 1309 has a function of performing access control on the BIOS-ROM 1310 and the ODD unit 1311.

The EC/KBC 1312 is an one-chip microcomputer incorporating therein an embedded controller for power management, and a keyboard controller for controlling the keyboard (KB) 1206 and the touch pad 1207.

The EC/KBC 1312 has a function of powering on/off the power supply of the personal computer 1200 in response to a user operation of the power button. The network controller 1313 is a communication device for making communication with an external network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a memory controller;
   a first memory chip having a first I/O terminal;
   a second memory chip having a second I/O terminal; and
   a signal line connecting the first I/O terminal and the second I/O terminal commonly to the memory controller, the signal line being used to transmit data between the first memory chip and the memory controller and between the second memory chip and the memory controller, and to transmit a command from the memory controller to the first memory chip and the second memory chip;
   wherein the memory controller outputs a first read command to the first memory chip and then outputs a second read command to the second memory chip, outputs a first data transfer command to the first memory chip after receiving read completion notification associated with the first read command from the first memory chip, outputs a third read command to the first memory chip after receiving all data associated with the first read command from the first memory chip in response to the first data transfer command, and then outputs a second data transfer command to the second memory chip to receive data associated with the second read command from the second memory chip.

2. The memory system according to claim 1, wherein the memory controller receives data associated with the second read command from the second memory chip in response to the second data transfer command while the first memory chip is internally reading data associated with the third read command from a memory cell array on the first memory chip.

3. The memory system according to claim 2, wherein the memory controller outputs a fourth read command to the second memory chip after receiving all data associated with the second read command from the memory chip in response to the second data transfer command while the first memory chip is internally reading data associated with the third read command from the memory cell array on the first memory chip.

4. The memory system according to claim 1, wherein the first memory chip further has a status signal terminal and the memory system further comprises a status signal line connecting the status signal terminal and the memory controller, and the first memory chip uses the status signal line to provide the read completion notification from the first memory chip to the memory controller.

* * * * *